(12) United States Patent
Takahashi

(10) Patent No.: US 9,820,358 B2
(45) Date of Patent: Nov. 14, 2017

(54) MOTION SENSOR LIGHT, SURVEILLANCE SYSTEM AND SURVEILLANCE METHOD

(71) Applicant: Panasonic Intellectual Property Management Co., Ltd., Osaka (JP)

(72) Inventor: Takeshi Takahashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/378,562

(22) Filed: Dec. 14, 2016

(65) Prior Publication Data

US 2017/0181249 A1 Jun. 22, 2017

(30) Foreign Application Priority Data

Dec. 21, 2015 (JP) ................................. 2015-248951
Dec. 22, 2015 (JP) ................................. 2015-250418
Dec. 22, 2015 (JP) ................................. 2015-250419

(51) Int. Cl.
*H05B 37/02* (2006.01)
*G08B 13/00* (2006.01)
(Continued)

(52) U.S. Cl.
CPC ......... *H05B 37/0227* (2013.01); *G08B 13/18* (2013.01); *G08B 13/19* (2013.01); *G08B 13/19634* (2013.01); *G08B 13/19695* (2013.01); *H05B 37/0218* (2013.01); *H05B 37/0281* (2013.01); *H05B 37/0272* (2013.01)

(58) Field of Classification Search
CPC ............ H05B 37/0227; H05B 37/0272; H05B 37/0218; H05B 37/0281; H05B 37/0245; H05B 33/0803; H05B 33/0872; H05B 37/02; H05B 33/0854; H05B 37/0254; H05B 37/0263; Y02B 20/44; Y02B 20/72;
(Continued)

(56) References Cited

U.S. PATENT DOCUMENTS 7,122,976 B1 * 10/2006 Null ................... H05B 37/0218
315/294
7,585,092 B2 * 9/2009 Huffman ................. F21S 6/003
362/198
(Continued)

FOREIGN PATENT DOCUMENTS

JP 2001-223092 A 8/2001
JP 2003-133084 A 5/2003
JP 2012-226945 A 11/2012

*Primary Examiner* — Vibol Tan
(74) *Attorney, Agent, or Firm* — Seed IP Law Group LLP

(57) ABSTRACT

A motion sensor light turns on a light once a motion sensor detects movement of a person. The light illuminates a monitoring area once the light is turned on. The motion sensor light initiates measurement of lighting duration of the light. After then, the motion sensor light initiates measurement of lights-out delay duration in a case where the movement of a person is no longer detected, and acquires a set value of the lights-out delay duration according to the lighting duration set in advance. The motion sensor light turns off the light in a case where a measured value of the lights-out delay duration exceeds the set value of the lights-out delay duration and a measured value of the lighting duration of the light exceeds a set value of the lighting duration.

10 Claims, 25 Drawing Sheets

(51) Int. Cl.
*G08B 13/18* (2006.01)
*G08B 13/19* (2006.01)
*G08B 13/196* (2006.01)

(58) Field of Classification Search
CPC .............. G08B 13/19; G08B 13/19634; G08B 13/19695; F21V 23/0442; F21V 23/0471
See application file for complete search history.

(56) References Cited

U.S. PATENT DOCUMENTS

| | | | | |
|---|---|---|---|---|
| 7,765,033 B2* | 7/2010 | Perry | ................ | H05B 37/0227 700/14 |
| 8,427,076 B2* | 4/2013 | Bourquin | ............ | H05B 37/0227 315/149 |
| 8,491,159 B2* | 7/2013 | Recker | ................ | H02J 9/02 362/20 |
| 8,764,242 B2* | 7/2014 | Recker | ................ | H02J 9/02 362/20 |
| 8,829,799 B2* | 9/2014 | Recker | ................ | H02J 9/02 315/159 |
| 8,866,392 B2* | 10/2014 | Chen | ................ | H05B 33/0818 315/152 |
| 9,089,016 B2* | 7/2015 | Recker | ................ | H02J 9/02 |
| 9,095,013 B2* | 7/2015 | Leinen | ................ | H05B 37/02 |
| 9,155,153 B1* | 10/2015 | Cregg | ................ | H05B 37/0227 |
| 9,255,700 B2* | 2/2016 | Csato | ................ | F21S 9/02 |
| 9,326,362 B2* | 4/2016 | Chen | ................ | H05B 37/0272 |
| 9,560,719 B2* | 1/2017 | Chen | ................ | G08B 15/00 |
| 9,613,503 B2* | 4/2017 | Herman | ................ | G08B 3/10 |
| 9,622,328 B2* | 4/2017 | Chen | ................ | H05B 37/0227 |
| 9,629,220 B2* | 4/2017 | Panopoulos | ....... | H05B 37/0209 |
| 9,655,217 B2* | 5/2017 | Recker | ............. | H05B 37/0272 |
| 2008/0252730 A1* | 10/2008 | Hong | ................ | G08B 13/19 348/155 |
| 2013/0293118 A1 | 11/2013 | Nagashima et al. | | |
| 2015/0108901 A1* | 4/2015 | Greene | ............. | H05B 37/0218 315/149 |
| 2016/0134826 A1* | 5/2016 | Scalisi | ............. | H04N 5/23206 348/143 |

* cited by examiner

FIG. 11

| NO. | ITEM | SETTING RANGE | INITIAL VALUE |
|---|---|---|---|
| 1 | LIGHTING DURATION | 0 SECOND TO 3 MINUTES | 20 SECONDS |
| 2 | LIGHTING PATTERN | CONTINUOUS LIGHTING /FLASHING | CONTINUOUS LIGHTING |
| 3 | LIGHTING LUMINANCE | 100 LUMENS TO 300 LUMENS | 300 LUMENS |
| 4 | ILLUMINANCE SENSOR SENSITIVITY | BRIGHT/ NORMAL/ DARK | NORMAL |
| 5 | MOTION SENSOR SENSITIVITY | HIGH/ MEDIUM/ LOW/ EXTREMELY LOW | MEDIUM |

| NO. | ITEM | SETTING RANGE | INITIAL VALUE |
|---|---|---|---|
| 1 | LIGHTING DURATION | 0 SECOND TO 3 MINUTES | 20 SECONDS |
| 2 | LIGHTING PATTERN | CONTINUOUS LIGHTING/FLASHING | CONTINUOUS LIGHTING |
| 3 | LIGHTING LUMINANCE | 100 LUMENS TO 300 LUMENS | 300 LUMENS |
| 4 | ILLUMINANCE SENSOR SENSITIVITY | BRIGHT/ NORMAL/ DARK | NORMAL |
| 5 | MOTION SENSOR SENSITIVITY | HIGH/ MEDIUM/ LOW/ EXTREMELY LOW | MEDIUM |
| 6 | LIGHTING CONTINUATION DURATION | 5 MINUTES TO 30 MINUTES | 15 MINUTES |

SMART CONTROL SETTING TABLE ~180

| SCENARIO NUMBER | ACTIVATION TRIGGER | OPERATING DEVICE | OPERATION CONTENT | OPERATION INITIATION CONDITION ||| OPERATION CONTENT (DETAILED) |||||
|---|---|---|---|---|---|---|---|---|---|---|---|
| | | | | ARM MODE | OPERATION TIME SLOT | REPEAT | CAMERA RECORDING TIME | PLUG ON TIME | LIGHTING DURATION | LIGHTING LUMINANCE | LIGHTING PATTERN |
| 1 | OPEN AND CLOSED STATE SENSOR = OPEN STATE | CAMERA | RECORD | AWAY MODE/AT HOME MODE | ALL DAY | EVERY DAY | 3 MINUTES | — | — | — | — |
| 2 | MOTION SENSOR OF MOTION SENSOR LIGHTING = DETECTION | PLUG | POWER SUPPLY ON | ALL MODES | 22:00 TO 6:00 NEXT DAY | MON TO FRI | — | 10 MINUTES | — | — | — |
| 3 | INFRARED SENSOR OF CAMERA PROVIDED OUTDOORS = DETECTION | MOTION SENSOR LIGHTING | LIGHT ON | ALL MODES | 22:00 TO 6:00 NEXT DAY | EVERY DAY | — | — | 10 SECONDS | 300 LUMENS | FLASHING |
| ... | ... | ... | ... | ... | ... | ... | ... | ... | ... | ... | ... |

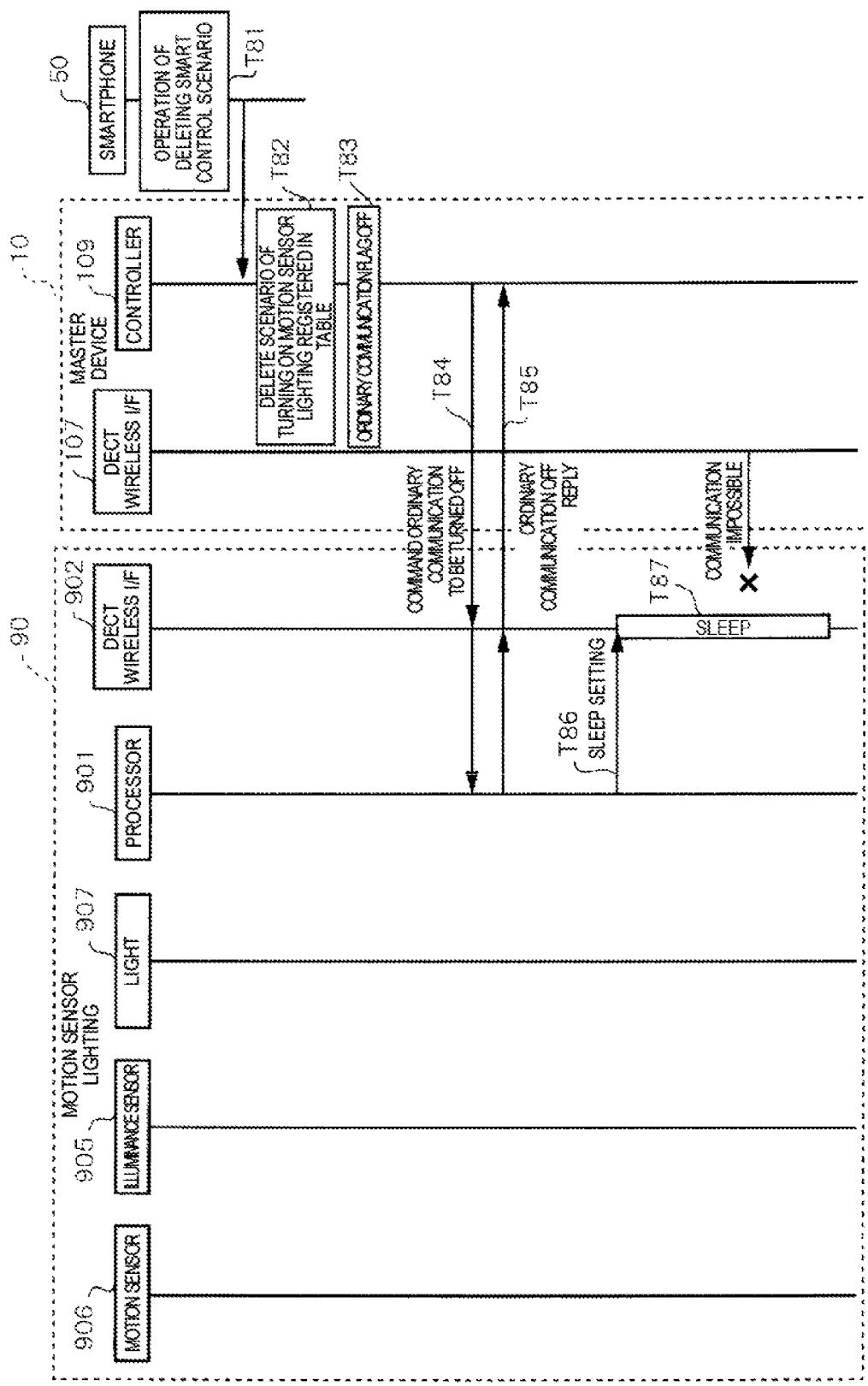

MOTION SENSOR LIGHT, SURVEILLANCE SYSTEM AND SURVEILLANCE METHOD

BACKGROUND

1. Technical Field

The present disclosure relates to a motion sensor light that is turned on once movement of a moving object is detected.

2. Description of the Related Art

In the related art, a motion sensor light, which warns a moving object by being turned on once movement of the moving object (for example, a human) entered a monitoring area at night is detected, is known, for example, as a product for security purposes.

In addition, for example, an illumination control device of Japanese Patent Unexamined Publication No. 2001-223092 is known as a related art that is related to an illumination device which detects movement of a moving object and then is turned on. The illumination control device of Japanese Patent Unexamined Publication No. 2001-223092 selects lighting maintaining duration of an illumination load based on the number of human body detection frequency within a predetermined period of time. This illumination control device is a device that illuminates a specific place (for example, a bathroom) where people frequently come and go and that can prevent wasteful illumination by altering the length of time for which light is turned on.

SUMMARY

After being turned on, the illumination control device of Japanese Patent Unexamined Publication No. 2001-223092 is turned off in a case where movement of a person is not detected in a period of lighting maintaining duration. Therefore, in a configuration of Japanese Patent Unexamined Publication No. 2001-223092, if lighting maintaining duration is short, the light is immediately turned off in a case where a person is not detected shortly after the light is turned on. Accordingly, the convenience of illumination decreases, which means it is inconvenient.

Meanwhile, if the lighting maintaining duration is set as a longer period, the light is turned off only in a case where a person is not detected for a long period of time since the light is turned off in a case where motion of a person is not detected in the period of the lighting maintaining duration, and therefore power consumption of the illumination control device increases. For example, in a case where the illumination control device operates by a battery for a reason of a place in which the illumination control device is installed, an increase in power consumption is a hindrance to use the illumination.

The present disclosure is devised in consideration of the aforementioned condition of the related art. An object of the present disclosure is to provide a motion sensor light in which keeping the light on in a certain length of period is compatible with turning off the light as soon as possible to restrict an increase in power consumption and the light is prevented from being immediately turned off even when set lighting duration has passed and movement of a moving object is no longer detected.

The present disclosure provides a motion sensor light that includes a light that remains turned on at least for a predetermined duration set in advance, a sensor that detects movement of a moving object, and a processor that turns on the light in a case where the movement of the moving object is detected, in which the processor initiates measurement of lighting duration of the light in response to the lighting of the light, after then, initiates measurement of lights-out delay duration that indicates time duration for a non-detection state of the moving object from a time when the moving object is no longer detected to a time when the light is turned off in a case where the movement of the moving object is no longer detected, and acquires a set value of the lights-out delay duration according to the duration set in advance, and the light is turned off in a case where a measured value of the lights-out delay duration exceeds the acquired set value of the lights-out delay duration, and a measured value of the lighting duration of the light exceeds the duration set in advance.

In addition, the present disclosure provides a surveillance system that includes a master device and a motion sensor light which are connected to each other. The master device saves each operation condition for lighting and lights-out of the motion sensor light, transmits a lighting command to the motion sensor light in a case where the operation condition for lighting is satisfied, and transmits a lights-out command to the motion sensor light in a case where the operation condition for lights-out is satisfied, and the motion sensor light is turned on in a case where the lighting command transmitted from the master device is received or in a case where a moving object is detected in the surroundings of the motion sensor light, and is turned off in a case where the lights-out command transmitted from the master device is received and a non-detection state of the moving object continues for a certain amount of time after the moving object is no longer detected.

In addition, the present disclosure provides a monitoring method for a surveillance system in which a motion sensor light and a master device are connected to each other. The monitoring method includes saving, which is carried out by the master device, each operation condition for lighting and lights-out of the motion sensor light, transmitting, which is carried out by the master device, a lighting command to the motion sensor light in a case where the operation condition for lighting is satisfied, transmitting, which is carried out by the master device, a lights-out command to the motion sensor light in a case where the operation condition for lights-out is satisfied, turning on the motion sensor light in a case where the lighting command transmitted from the master device is received or in a case where a moving object is detected in the surroundings of the motion sensor light, and turning off the motion sensor light in a case where the lights-out command transmitted from the master device is received and a non-detection state of the moving object continues for a certain amount of time after the moving object is no longer detected.

According to the present disclosure, keeping the light on in a certain length of period is compatible with turning off the light as soon as possible to restrict an increase in power consumption, and the light is prevented from being immediately turned off even when set lighting duration has passed and the movement of the moving object is no longer detected.

BRIEF DESCRIPTION OF THE DRAWINGS

FIG. 11 is a view illustrating an example of a registration content of a setting information table of the motion sensor light according to the present exemplary embodiment;

FIG. 12 is a view illustrating an example of the registration content of the setting information table of the motion sensor light according to the present exemplary embodiment;

FIG. 13 is a view illustrating an example of a registration content of a smart control setting table;

FIG. 25 is a sequence diagram illustrating an example of operation procedures of communication between the motion sensor light and the master device in a case where the smart control has transitioned from a state of being set to a state of being not set.

DETAILED DESCRIPTION

Figure 1:
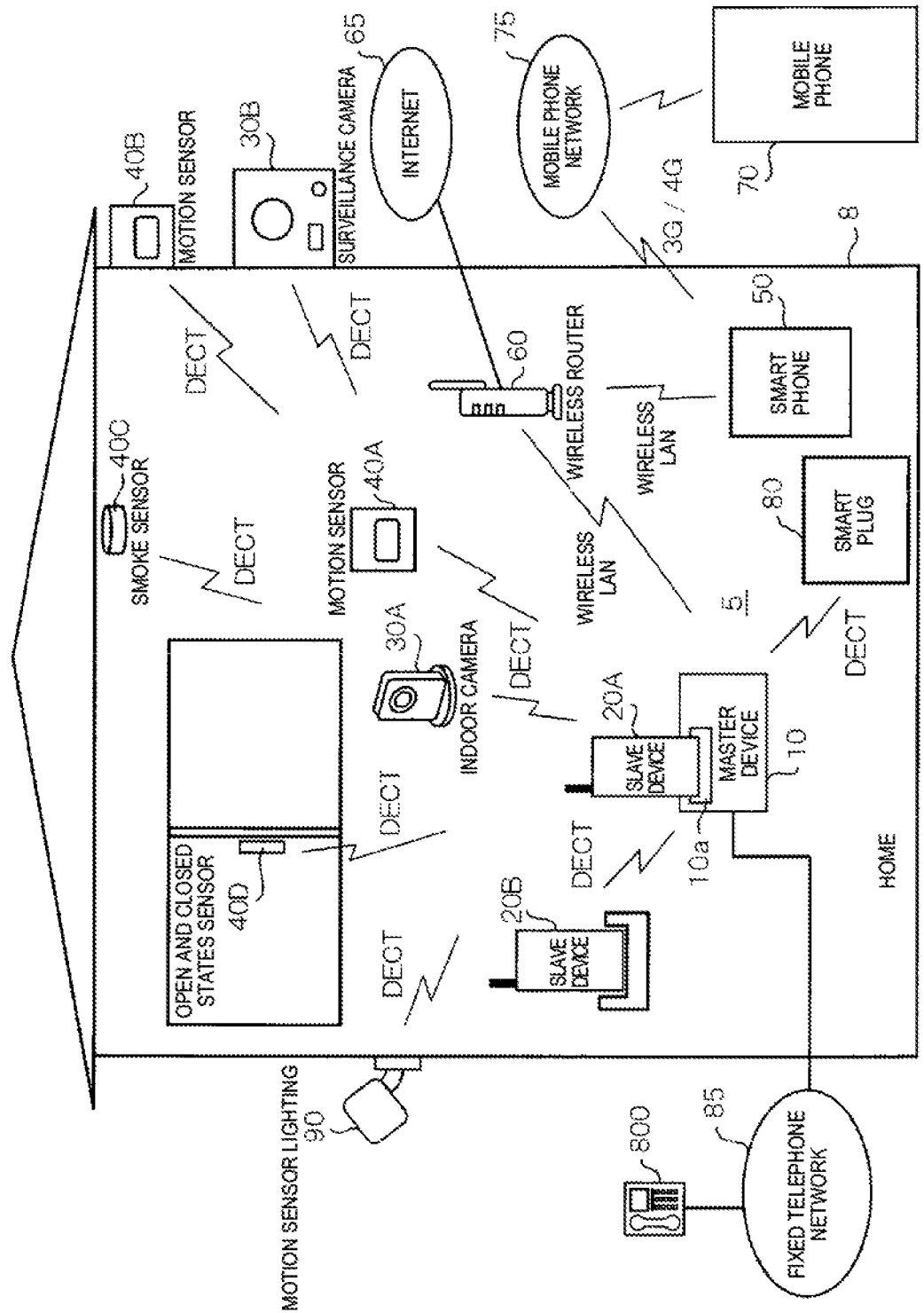
FIG. 1 is a view illustrating an example of a system configuration of a surveillance camera system which incorporates a motion sensor light according to the present exemplary embodiment.

Hereinafter, an exemplary embodiment (hereinafter, referred to as the present exemplary embodiment) in which a motion sensor light according to the present disclosure is specifically disclosed will be described in detail with reference to appropriate drawings. However, in some cases, needlessly detailed descriptions will not be made. For example, in some cases, matters which are already known well will not be described in detail or practically the same configurations will not be described repeatedly. That is to avoid the following descriptions being needlessly long, and to promote understanding of those skilled in the art. The accompanying drawings and the following descriptions are provided to help those skilled in the art sufficiently understand the present disclosure. The drawing and the descriptions are not intended to limit the scope of the claims.

Hereinafter, the motion sensor light of the present exemplary embodiment will be described, for example, as a device that is applied to a surveillance camera system which is provided on the premises of a user's house (for example, inside the house and outside the house on the premises, including a garden, are included). However, as a matter of course, the motion sensor light of the present exemplary embodiment is not limited to security purposes for the premises of the user's house and may be used for security purposes for any of places of business, including a store, a factory, and an office. In addition, instead of being used for crime prevention, the motion sensor light of the present exemplary embodiment may be used in procedure to improve usability for people who come and go the place where the light is provided.

Without being limited to a device category of the motion sensor light, the present disclosure can be expressed as a lighting control method for the motion sensor light, which specifies an operation of turning on the light, a lights-out control method for the motion sensor light, which specifies an operation of turning off the light, or a light control method for the motion sensor light, which specifies a control including turning on or turning off the light.

Furthermore, the surveillance camera system will be described as an example of a surveillance system according to the present disclosure. The motion sensor light of the present exemplary embodiment will be described, for example, as a device that is applied to a surveillance camera system which is provided on the premises of the user's house (for example, inside the house and outside the house on the premises, including a garden, are included). However, as a matter of course, the motion sensor light of the present exemplary embodiment is not limited to security purposes for the premises of the user's house and may be used for security purposes for any of places of business, including a store, a factory, and an office. In addition, instead of being used for crime prevention, the motion sensor light of the present exemplary embodiment may be used in procedure to improve usability for people who come and go the place where the light is provided.

Without being limited to the surveillance system, the present disclosure can be expressed as a monitoring method for the surveillance system and can be specified as a device category of the motion sensor light included in the surveillance camera system as an example of the surveillance system.

FIG. 1 is a view illustrating an example of a system configuration of surveillance camera system 5 that incorporates motion sensor light 90 according to the present exemplary embodiment. Surveillance camera system 5 is provided in, for example, home 8, and is configured with master device 10 and two slave devices 20A and 20B of a fixed telephone, two cameras 30 (for example, indoor camera 30A and surveillance camera 30B), various types of sensors 40 (for example, motion sensors 40A and 40B, smoke sensor 40C, open and closed states sensor 40D), smart plug 80, motion sensor light 90, smartphone 50, and wireless router 60. The configuration of surveillance camera system 5 is merely an example, and can be changed into various forms.

Master device 10 performs a role of a gateway related to communication with various types of devices in surveillance camera system 5. That is, master device 10 is a control device that controls an entire operation of surveillance camera system 5, and is connected to slave devices, cameras, sensors, and the like so as to be capable of communicating with the slave devices, the cameras, the sensors, and the like using, for example, the communication system of Digital Enhanced Cordless Telecommunications (DECT). In addition, master device 10 is connected to Internet 65 (network) via wireless router 60 using wireless LAN. In addition, master device 10 is connected to fixed telephone network 85 in a wired manner, and performs intermediation processing for making a call possible between slave devices 20A and 20B and other fixed telephone 800. In addition, master device 10 may directly make a call to other fixed telephone 800. In addition, master device 10 has a function of charging slave device 20A inserted in insertion port 10a.

Slave devices 20A and 20B are connected to master device 10 by means of the communication system of DECT, and are capable of making a call to master device 10. In particular, the two slave devices are collectively referred to as slave device 20 in a case where there is no need to differentiate between two slave devices 20A and 20B.

Various types of sensors 40 (for example, motion sensors 40A and 40B, smoke sensor 40C, and open and closed states sensor 40D) are connected to master device 10 by means of the communication system of DECT. Herein, open and closed states sensor 40D that detects open and closed states of a window, smoke sensor 40C that senses smoke, and motion sensors 40A and 40B that sense a human by means of infrared radiation are used as sensors. In particular, these sensors will be collectively referred to as sensor 40 in a case where there is no need to differentiate between these sensors. In addition, as will be described later, infrared radiation sensor 313 (refer to FIG. 4) mounted in camera 30 is also used as a motion sensor.

The two cameras (for example, indoor camera 30A and surveillance camera 30B) have a call function, and are connected to master device 10 by means of the communication system of DECT, thereby making a call possible between slave devices 20A and 20B. Herein, surveillance camera 30B that images the outside and indoor camera 30A that images home 8 are used as cameras. In particular, theses cameras will be collectively referred to as camera 30 in a case where there is no need to differentiate between the types of cameras.

Smart plug 80 has a wireless communication function using DECT, and is connected to master device 10 using a wireless communication system of DECT. Smart plug 80 switches between energization and de-energization of a commercial alternating current power supply or direct current power supply that supplies power to various types of electrical devices (for example, an air conditioner, a lighting device, camera 30, and sensor 40) connected to smart plug 80 itself, in accordance with a command transmitted from master device 10. Smart plug 80 will be described in detail later.

Motion sensor light 90 detects human movement in a monitoring area (for example, a home garden and a porch), and is turned on to illuminate the surroundings of the monitoring area once the surroundings gets dark at night or the like. The luminance of motion sensor light 90 may be high to an extent that motion sensor light 90 brightly illuminates the monitoring area, and may be low to an extent that motion sensor light 90 is used as a warning light. Motion sensor light 90 has a wireless communication function using DECT, and is connected to master device 10 using the wireless communication system of DECT. Motion sensor light 90 is capable of arbitrary setting an operation condition (hereinafter, referred to as a "scenario" in some cases) of motion sensor light 90 at its discretion from smartphone 50 via master device 10. Motion sensor light 90 will be described in detail later.

Smartphone 50 is connected to master device 10 via wireless router 60 using wireless LAN, and is connected to other mobile phone 70 or other smartphones (not illustrated) via mobile phone network 75 using various types of communication systems including third generation (3G) and fourth generation (4G) communication systems.

Figure 2:
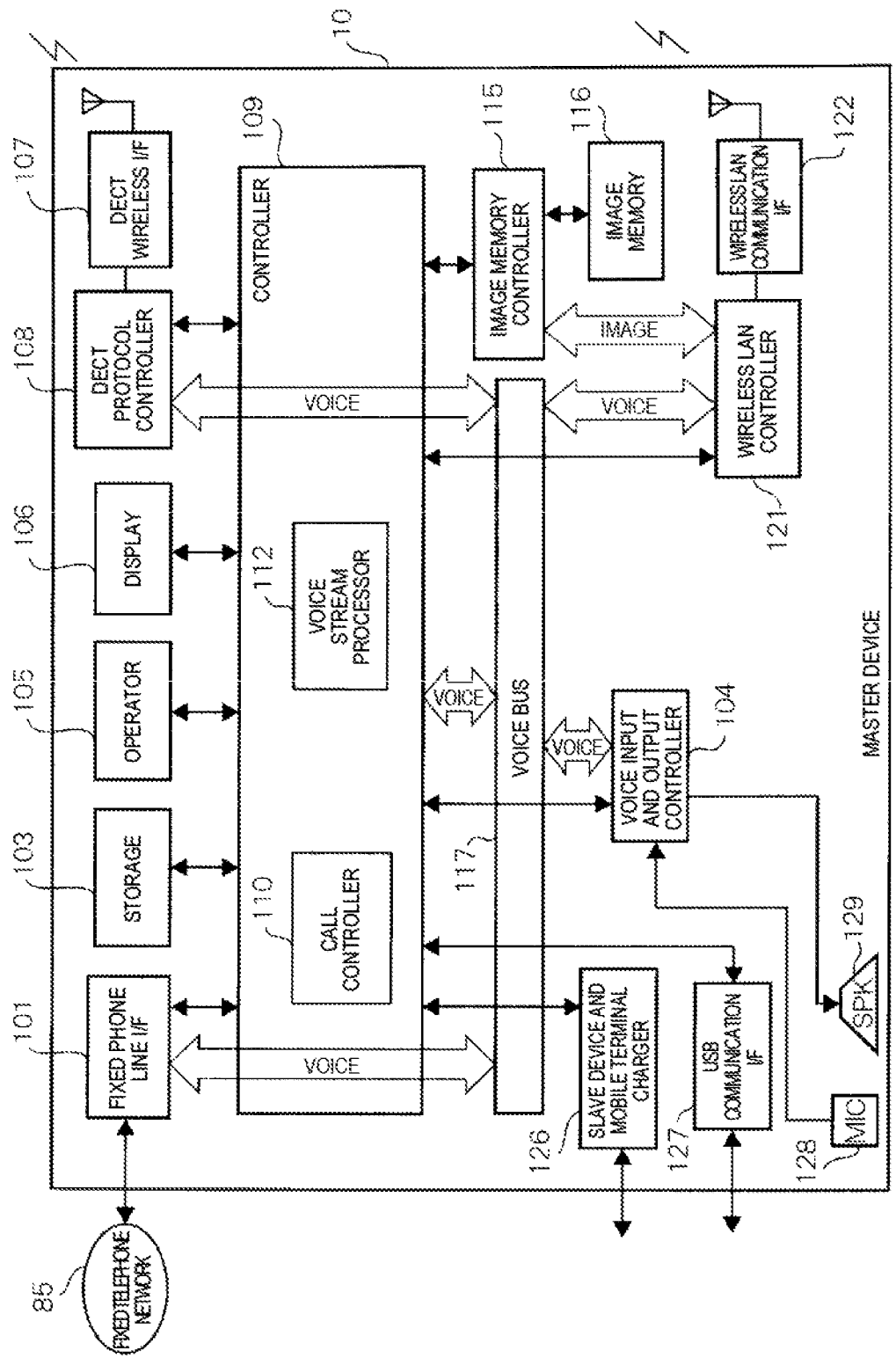
FIG. 2 is a block diagram illustrating an example of an internal configuration of a master device in the surveillance camera system according to the present exemplary embodiment.

FIG. 2 is a block diagram illustrating an example of an internal configuration of master device 10 in surveillance camera system 5 according to the present exemplary embodiment. Master device 10 has a configuration in which controller 109, storage 103, operator 105, and display 106 are included. Master device 10 receives various types of input operations, and also displays information, including an image, onto display 106. Call controller 110 and voice stream processor 112 are mounted in controller 109, and controller 109 controls calls and processes voice data. Display 106 may be configured with a touch panel. Display 106 corresponding to the touch panel receives an operation by the user and outputs the operation to controller 109. Display 106 displays display data (for example, data of smart control setting screen GM which will be described later) sent over from controller 109.

In addition, master device 10 has image memory controller 115 and image memory 116. Master device 10 receives image data which is imaged by camera 30 and transmitted from camera 30 and stores the data in image memory 116.

In addition, master device 10 has wireless LAN controller 121 and wireless LAN communication I/F 122. Master device 10 transmits image data and voice data to and receives image data and voice data from smartphone 50 and camera 30 via wireless router 60 connected by wireless LAN.

In addition, master device 10 has DECT protocol controller 108 and DECT wireless I/F 107, and carries out wireless connection and wireless communication with each of slave device 20, sensor 40, camera 30, smart plug 80, and motion sensor light 90, using wireless communication system of Digital Enhanced Cordless Telecommunications (DECT).

In addition, master device 10 has voice bus 117, voice input and output controller 104, speaker 129, and microphone 128, and inputs and outputs voice to the outside.

In addition, master device 10 has fixed phone line I/F 101, and is capable of making a call to external fixed telephone 800 connected to fixed telephone network 85. As described above, master device 10 may control various types of voice data processing during a call such that the call can be made between external fixed telephone 800 connected to fixed telephone network 85 and slave devices 20A and 20B.

In addition, master device 10 has slave device and mobile terminal charger 126, and charges slave device 20 or smartphone 50 inserted in insertion port 10a.

In addition, master device 10 has USB communication I/F 127, and transmits data to and receives data from a device or a memory having a Universal Serial Bus (USB) standard interface.

In addition, master device 10 correlates each of various types of sensors 40 (for example, motion sensors 40A and 40B, smoke sensor 40C, and open and closed states sensor 40D) with a plurality of cameras 30, and then writes and registers the sensors and the cameras in storage 103. For example, motion sensor 40B and surveillance camera 30B are registered after being correlated with each other since motion sensor 40B and surveillance camera 30B are provided outdoors at places adjacent to each other. In addition, surveillance camera 30B is registered after being correlated with infrared radiation sensor 313 as well since infrared radiation sensor 313, which is a motion sensor, is integrally mounted in surveillance camera 30B (refer to FIG. 4), as will be described later. In addition, each of motion sensor 40A, smoke sensor 40C, and open and closed states sensor 40D is correlated with indoor camera 30A and then is registered since all of the sensors are provided in home 8.

Figure 3:
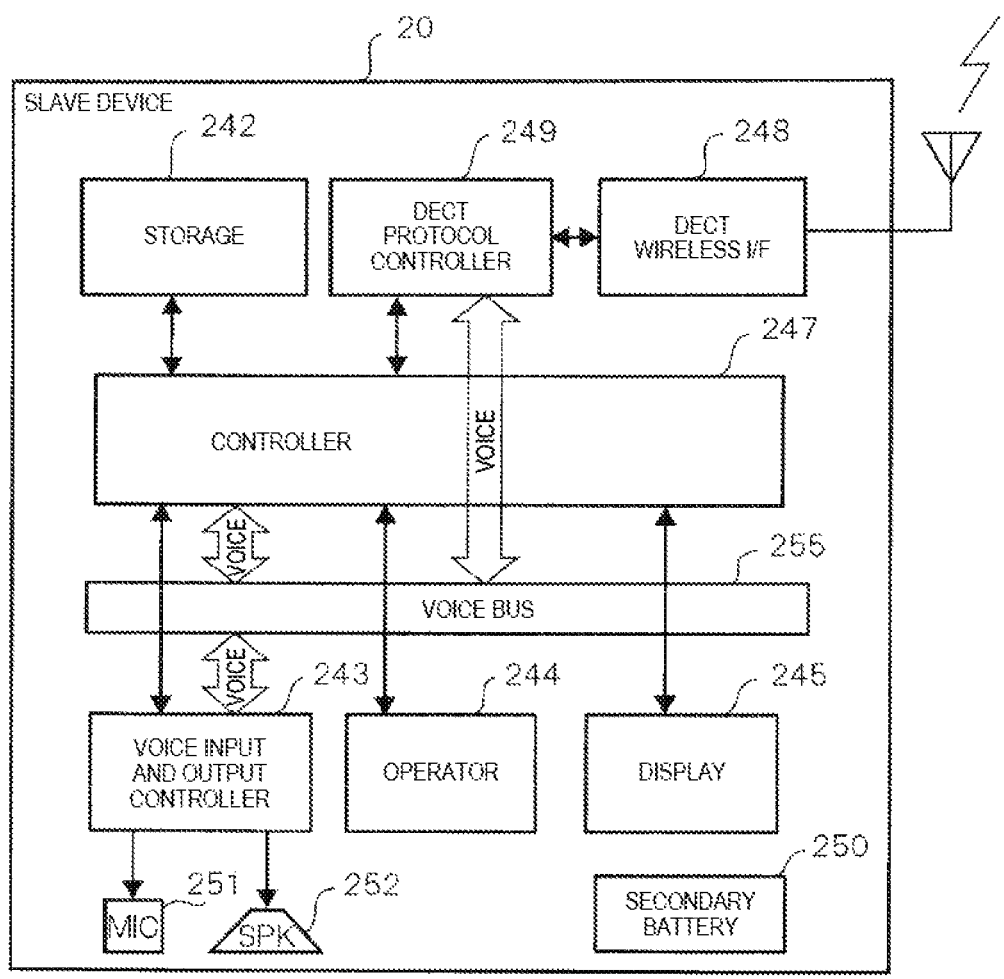
FIG. 3 is a block diagram illustrating an example of an internal configuration of a slave device in the surveillance camera system according to the present exemplary embodiment.

FIG. 3 is a block diagram illustrating an example of an internal configuration of slave device 20 in surveillance camera system 5 according to the present exemplary embodiment. Slave device 20 has a configuration in which controller 247, storage 242, operator 244, display 245 are included. Slave device 20 receives various types of input operations, and also displays information, including an image, onto display 245.

In addition, slave device 20 has DECT protocol controller 249 and DECT wireless I/F 248, and carries out wireless connection and wireless communication with each of master device 10, sensor 40, and camera 30, using wireless communication system of DECT.

In addition, slave device 20 has voice bus 255, voice input and output controller 243, speaker 252, and microphone 251, and makes a call by inputting and outputting voice to the outside (for example, external fixed telephone 800).

Figure 4:
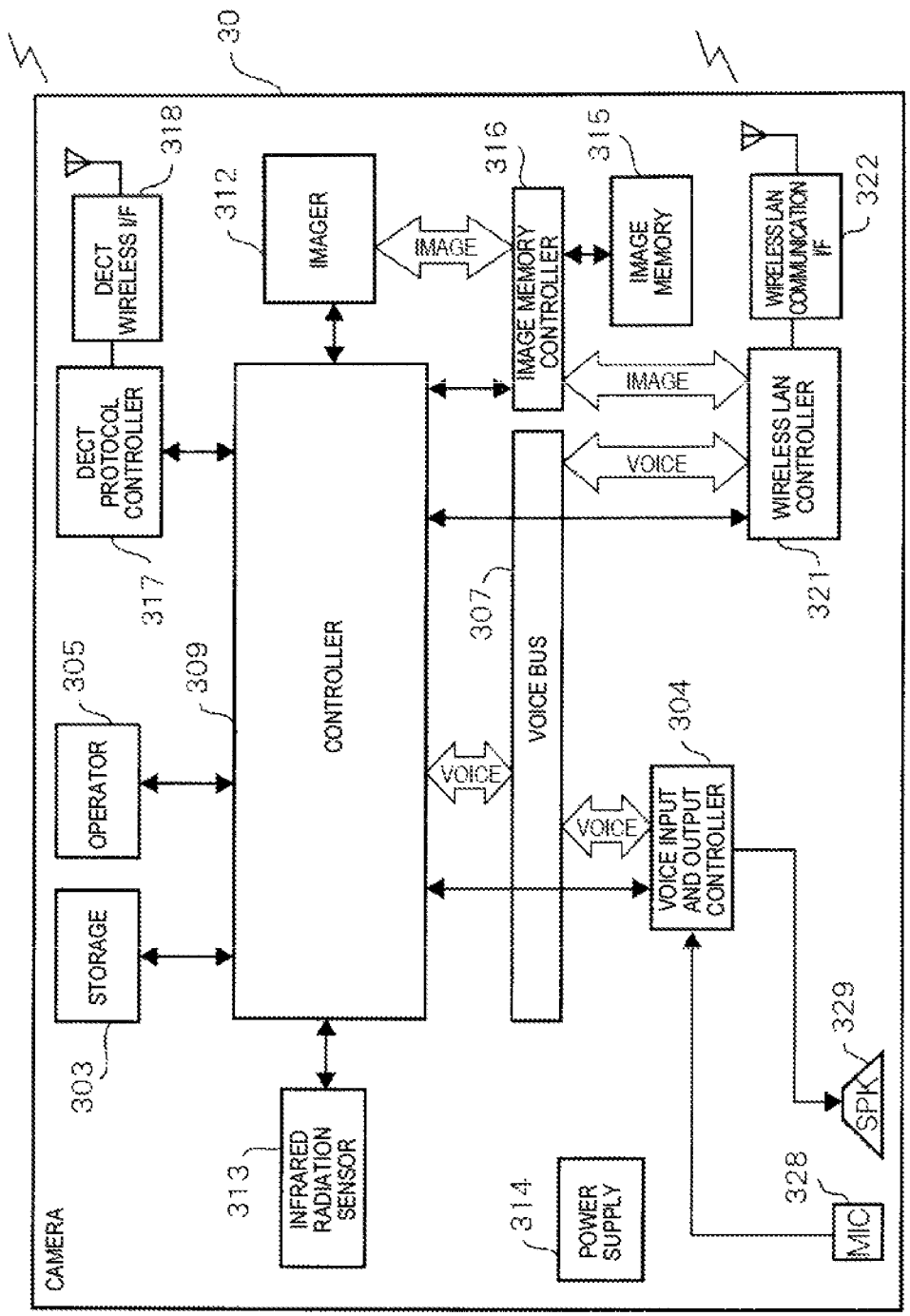
FIG. 4 is a block diagram illustrating an example of an internal configuration of a camera in the surveillance camera system according to the present exemplary embodiment.

FIG. 4 is a block diagram illustrating an example of an internal configuration of camera 30 in surveillance camera system 5 according to the present exemplary embodiment. Both of indoor camera 30A and surveillance camera 30B, which are examples of camera 30, have substantially the same specifications. Camera 30 has a configuration in which controller 309, storage 303, and operator 305 are included. Camera 30 performs an operation related to imaging, and receives an input operation.

In addition, camera 30 has DECT protocol controller 317 and DECT wireless I/F 318, and carries out wireless connection and wireless communication with master device 10 using wireless communication system of DECT.

In addition, camera 30 has wireless LAN controller 321 and wireless LAN communication I/F 322, and transmits image data and voice data to and receives image data and voice data from master device 10 and smartphone 50 via wireless router 60 connected by wireless LAN.

In addition, camera 30 has voice bus 307, voice input and output controller 304, speaker 329, and microphone 328, and makes a call by inputting and outputting voice to the outside (for example, slave devices 20A and 20B).

In addition, camera 30 has imager 312, image memory controller 316, and image memory 315, and stores image data imaged by imager 312 in image memory 315. Imager 312 has a lens and an imaging element (for example, an image sensor such as a charged coupled device (CCD) and a complementary metal-oxide semiconductor (CMOS)).

Infrared radiation sensor (pyroelectric sensor) 313, which is a passive infrared (PIR) sensor, is integrally mounted, as a motion sensor, in camera 30. Infrared radiation sensor 313 detects changes in heat (infrared radiation) emitted by a person (human) to sense human presence. Camera 30 has, for example, power supply 314 that is configured with a commercial alternating current power supply or direct current power supply.

Figure 5:
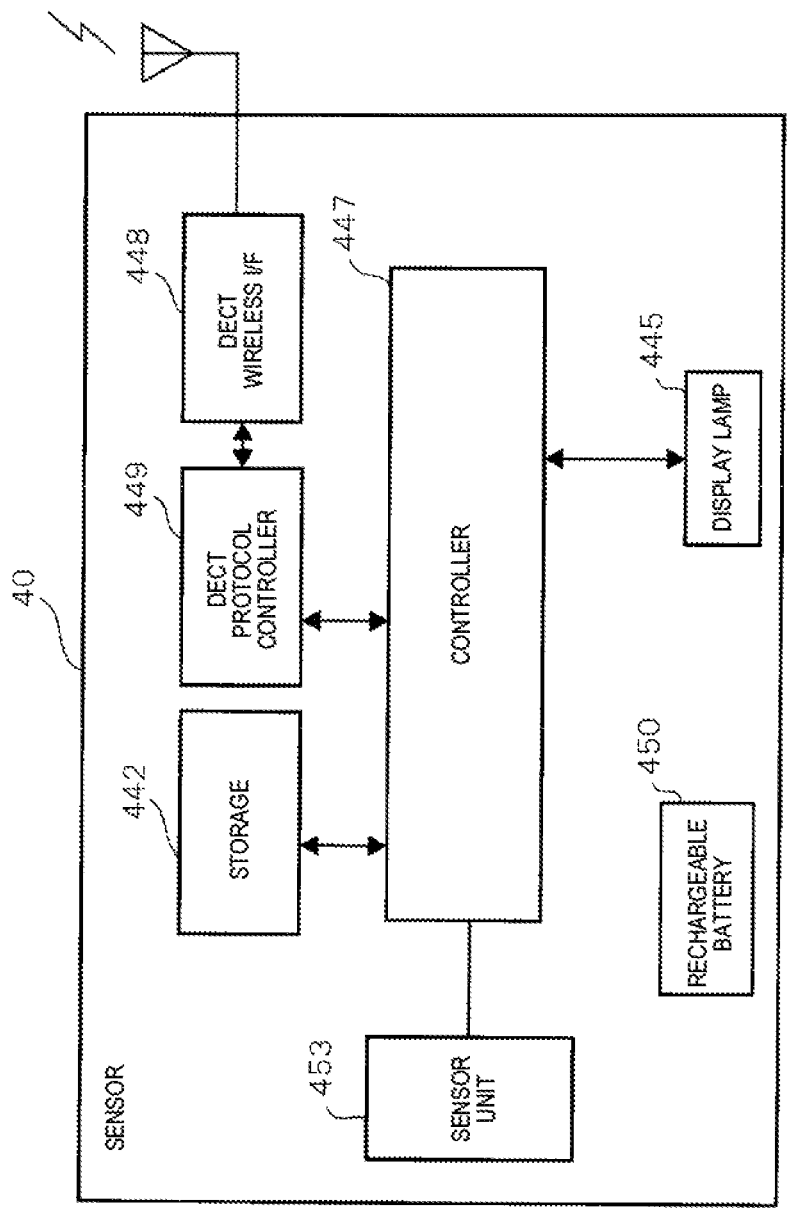
FIG. 5 is a block diagram illustrating an example of an internal configuration of a sensor in the surveillance camera system according to the present exemplary embodiment.

FIG. 5 is a block diagram illustrating an example of an internal configuration of sensor 40 in surveillance camera system 5 according to the present exemplary embodiment. Sensor 40 has a configuration in which controller 447, storage 442, and display lamp 445 are included. Sensor 40 performs a predetermined detection operation, including turning on display lamp 445, in a case where a target (for example, an intruder. The same applies hereinafter.) is detected.

In addition, sensor 40 has DECT protocol controller 449 and DECT wireless I/F 448, and carries out wireless connection and wireless communication using wireless communication system of DECT with master device 10. Once a target is detected, sensor 40 transmits information detected by the sensor to master device 10.

Sensor unit 453 varies depending on the type of sensor 40. For example, in a case of motion sensors 40A and 40B, sensor unit 453 is a PIR sensor that senses a person by changes in infrared radiation. In a case of open and closed states sensor 40D that detects open and closed states of a window or the like, sensor unit 453 is a reed switch that switches between on and off according to the open and closed states. In a case of smoke sensor 40C, sensor unit 453 is a light emitter and receiver that senses smoke from emitted light being blocked by the smoke.

Rechargeable battery 450 is a battery that can be charged, and supplies required power to each unit of sensor 40.

Figure 6:
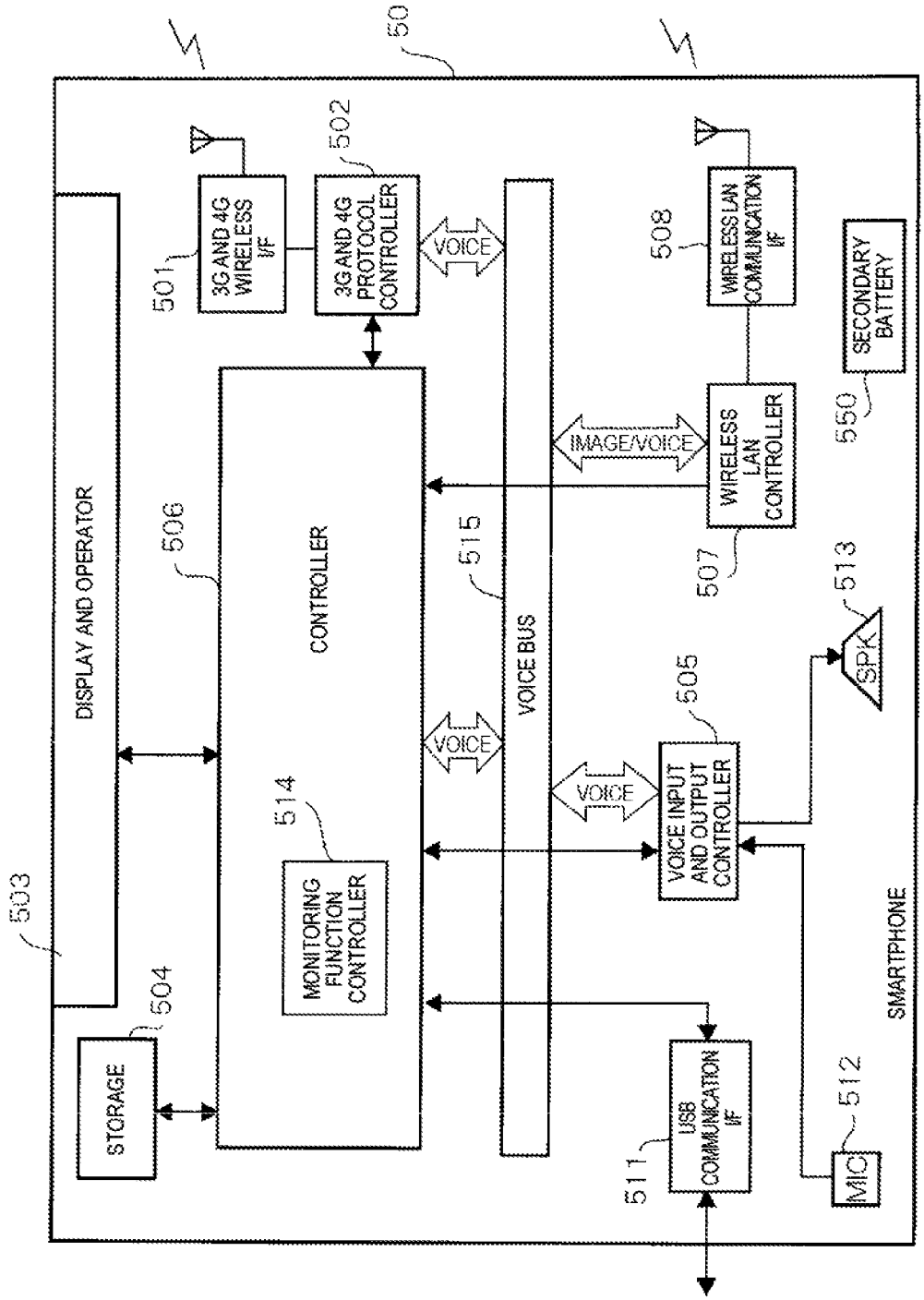
FIG. 6 is a block diagram illustrating an example of an internal configuration of a smartphone in the surveillance camera system according to the present exemplary embodiment.

FIG. 6 is a block diagram illustrating an example of an internal configuration of smartphone 50 in surveillance camera system 5 according to the present exemplary embodiment. Smartphone 50 has a configuration in which controller 506, storage 504, and display and operator (touch panel) 503 are included. Smartphone 50 receives various types of input operations, and displays information, including an image, onto touch panel 503. Monitoring function controller 514, which is capable of setting a function of camera 30 and setting information (for example, refer to FIG. 10) and a scenario of motion sensor light 90, is mounted in controller 506, as will be described later. Touch panel 503 is a display input unit in which a display and an operator are integrated with each other. Touch panel 503 displays information, including an image and an icon, onto a screen, and also displays a screen of generating setting information of motion sensor light 90 (not illustrated) and a screen of setting a scenario of motion sensor light 90 (not illustrated). In addition, touch panel 503 receives a tap operation (or touch operation) performed on the screen by the user.

In addition, smartphone 50 has 3G and 4G protocol controller 502 and 3G and 4G wireless I/F 501, and carries out wireless connection and wireless communication with mobile phone 70 and other smartphones connected to mobile phone network 75 using a third generation (3G) or fourth generation (4G) wireless communication system.

In addition, smartphone 50 has voice bus 515, voice input and output controller 505, speaker 513, and microphone 512, and inputs and outputs voice to the outside.

In addition, smartphone 50 has wireless LAN controller 507 and wireless LAN communication I/F 508, and transmits image data and voice data to and receives image data and voice data from master device 10 and camera 30 via wireless router 60 connected by wireless LAN. In addition, if there is a user input operation for operating smartphone 50, smartphone 50 receives a signal generated by the operation. Then, smartphone 50 can newly create various types of setting information of motion sensor light 90 and smart plug 80, and change the setting information at its discretion, via wireless router 60 and master device 10.

In addition, smartphone 50 has USB communication I/F 511, and transmits data to and receives data from a device or a memory having a Universal Serial Bus (USB) standard interface.

Figure 7:
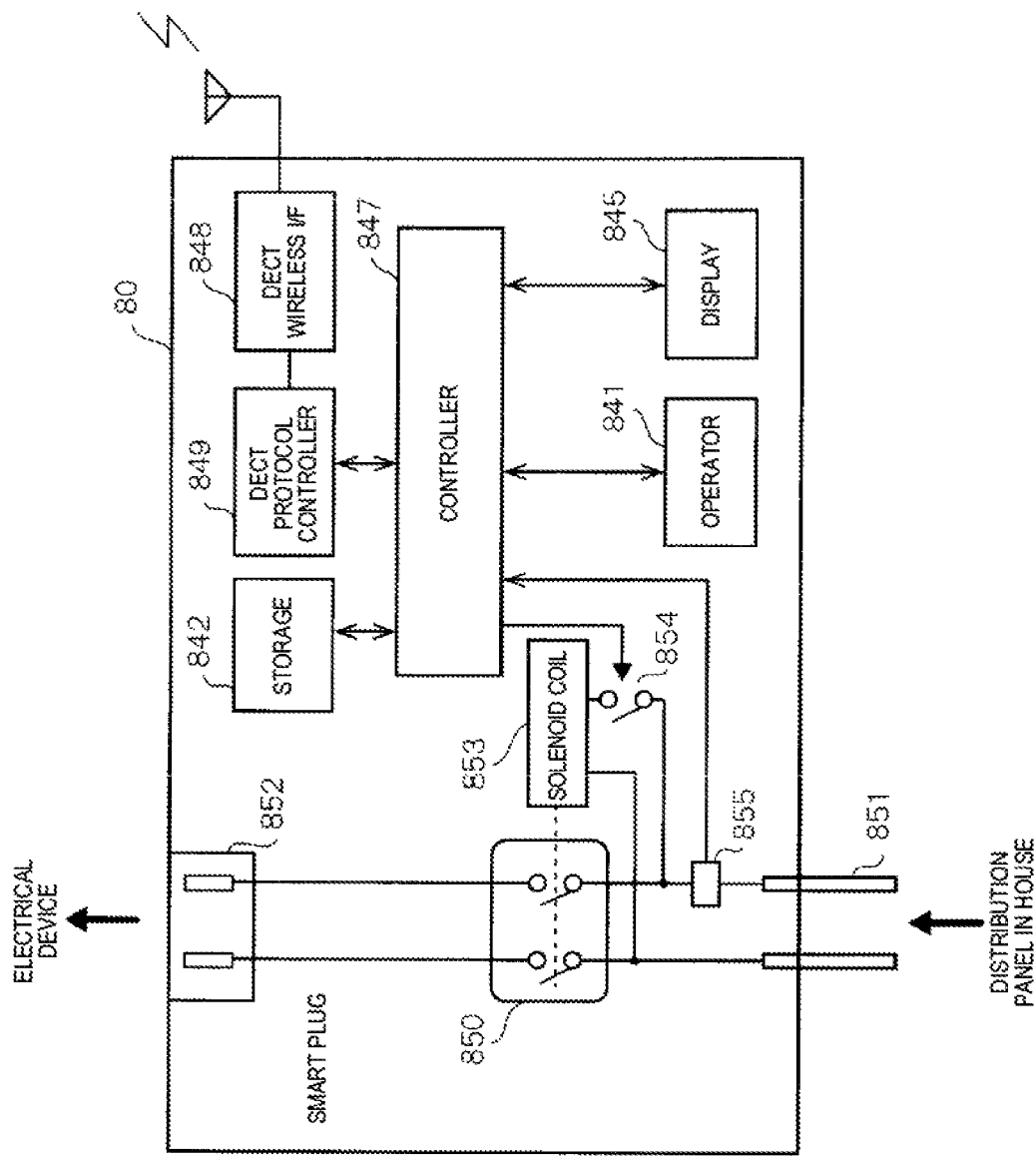
FIG. 7 is a block diagram illustrating an example of an internal configuration of a smart plug in the surveillance camera system according to the present exemplary embodiment.

FIG. 7 is a block diagram illustrating an example of an internal configuration of smart plug 80 in surveillance camera system 5 according to the present exemplary embodiment. Smart plug 80 has controller 847, storage 842, and display 845 provided with a display lamp. Schedule setting information related to on or off conditions that can be set or changed by smart plug 80 carrying out wireless communication using DECT with master device 10 is registered in storage 842.

In addition, smart plug 80 has DECT protocol controller 849 and DECT wireless I/F 848, and carries out connection to master device 10 through wireless communication using wireless communication system of DECT. In accordance with a signal (that is, switching control signal from master device 10) transmitted via the connection through wireless communication, smart plug 80 switches between supplying and shutting off of a commercial alternating current power supply or direct current power supply to each electrical device (for example, an air conditioner, a lighting device, camera 30, and sensor 40) connected to each smart plug 80.

In addition, smart plug 80 has switch 850. Switch 850 connects or disconnects a power supply line, which is a power supply, for example, between plug terminal 851 connected to an outlet terminal (not illustrated) exposed at various positions (for example, positions of a dining room, a living room, and a bed room) in home 8 connected from a distribution panel (not illustrated) of home 8 and outlet terminal 852 connected to an electrical device. Switch 850 is driven by, for example, solenoid coil 853. Switch 850 is closed by a drive current from an alternating current power supply flowing in solenoid coil 853, and plug terminal 851 and outlet terminal 852 are electrically connected. In addition, switch 854 causes a drive current to flow or not to flow in solenoid coil 853 by the control of controller 847.

Current detecting element 855 is provided between plug terminal 851 and switch 850. Once a current flows between plug terminal 851 and outlet terminal 852, current detecting element 855 detects the current and transmits a detection signal to controller 847. For example, if there is an input operation from operator 841, controller 847 displays an amount (power supply amount) of power being supplied to an electrical device onto display 845 in a case where the detection signal from current detecting element 855 is received.

Controller 847 outputs, to switch 854, a switching control signal for causing plug terminal 851 and outlet terminal 852 to be electrically connected to each other, for example, in a case where DECT wireless I/F 848 receives a command signal for operation mode of smart plug 80 from master device 10 in accordance with a command, based on an operation by the user, from smartphone 50. Accordingly, plug terminal 851 and outlet terminal 852 are electrically connected to each other. Meanwhile, controller 847 outputs, to switch 854, a switching control signal for causing plug terminal 851 and outlet terminal 852 to be electrically disconnected to each other, for example, in a case where DECT wireless I/F 848 receives a command signal for operation stop mode of smart plug 80 from master device 10 in accordance with a command, based on an operation by the user, from smartphone 50. Accordingly, plug terminal 851 and outlet terminal 852 are electrically disconnected to each other.

In addition, by referring to schedule setting information stored in storage 842, controller 847 outputs, to switch 854, the switching control signal for causing plug terminal 851 and outlet terminal 852 to be electrically connected to each other once it becomes a time for an operation mode included in the schedule setting information. Accordingly, plug terminal 851 and outlet terminal 852 are electrically connected to each other. During the time for the operation mode, a state where plug terminal 851 and outlet terminal 852 are electrically connected is maintained unless DECT wireless I/F 848 receives a command signal for operation stop mode transmitted from master device 10, for example, in accordance with the command, based on an operation by the user, from smartphone 50.

Meanwhile, by referring to schedule setting information stored in storage 842, controller 847 outputs, to switch 854, a switching control signal for causing plug terminal 851 and outlet terminal 852 to be electrically disconnected to each other once it becomes a time for operation stop mode included in the schedule setting information. Accordingly, plug terminal 851 and outlet terminal 852 are electrically disconnected to each other. During the time for operation stop mode, a state where plug terminal 851 and outlet terminal 852 are electrically disconnected to each other is maintained unless DECT wireless I/F 848 receives a command signal for operation mode transmitted from master device 10, for example, in accordance with the command, based on an operation by the user, from smartphone 50.

Figure 8:
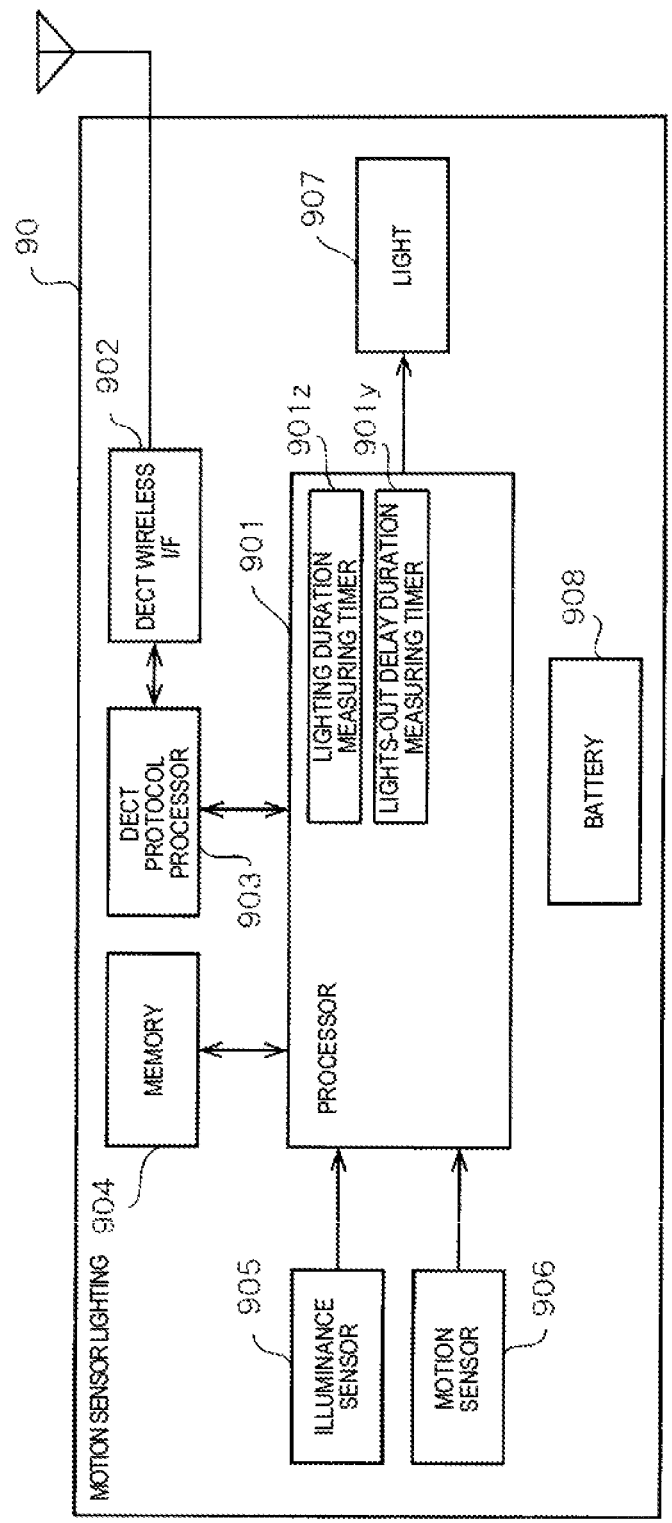
FIG. 8 is a block diagram illustrating an example of an internal configuration of a motion sensor light according to the present exemplary embodiment.

FIG. 8 is a block diagram illustrating an example of an internal configuration of motion sensor light 90 according to the present exemplary embodiment. Motion sensor light 90 has a configuration in which processor 901, DECT wireless I/F 902, DECT protocol processor 903, memory 904, illuminance sensor 905, motion sensor 906, light 907, and battery 908 are included.

Processor 901 carries out wireless connection and wireless communication with master device 10 using wireless communication system of DECT, by means of DECT wireless I/F 902 and DECT protocol processor 903. Motion sensor light 90 can be connected to devices, including various types of sensors 40, smartphone 50, and smart plug 80, by wirelessly communicating with master device 10.

In addition, lighting duration measuring timer 901*z* and lights-out delay duration measuring timer 901*y* are mounted in processor 901. Lighting duration measuring timer 901z measures lighting duration Ta of light 907. Lights-out delay duration measuring timer 901y measures lights-out delay duration Td. Lights-out delay duration Td refers to time duration for a moving object non-detection state from a time when movement of a moving object (for example, a human) is no longer detected by motion sensor 906 to a time when light 907 is turned off. As will be described later, processor 901 compares a value of lights-out delay duration Td measured by lights-out delay duration measuring timer 901y with set value Tdm of lights-out delay duration stored in memory 904, and controls turning on or turning off of light 907 based on the comparison results.

In a case where light 907 detects a human during lights-out, processor 901 initiates measurement of lighting duration of light 907 and initiates lighting of light 907.

Processor 901 turns off light 907 in a case where it is determined that a measured value of lights-out delay duration exceeds a set value of lights-out delay duration and a measured value of lighting duration of light 907 exceeds a set value of lighting duration of light 907 during lighting of light 907. For example, a case where a human is no longer detected at a time point when the set value of lighting duration of light 907 is 30 seconds, the set value of lights-out delay duration is 5 seconds, and the measured value of lighting duration of light 907 is 25 seconds is considered. In this case, once a human non-detection state continues for 5 seconds from the time when a human is no longer detected, light 907 is turned off since the measured value of lights-out delay duration has reached the set value of lights-out delay duration (5 seconds) and the measured value of lighting duration of light 907 has reached the set value of lighting duration of light 907 (30 seconds). In this example, light 907 had been lit up for 30 seconds in total.

In addition, processor 901 is capable of communicating with master device 10 by using wireless communication system of DECT since motion sensor light 90 is driven by a battery. However, processor 901 is set to stay in a communication sleep mode (that is, a mode indicating a state where communication with master device 10 is suspended temporarily), excluding a time when wireless communication with master device 10 is required to be carried out (for example, human detection time and periodic communication time with master device 10 which will be described later). Accordingly, motion sensor light 90 can restrict an increase in power consumption since motion sensor light 90 is not required to be set in an ordinary communication mode with master device 10.

In the present exemplary embodiment, set value Tdm of lights-out delay duration can be set, for example, by means of two methods. In a first setting method, processor 901 stores lights-out delay duration table 170 (refer to FIG. 11) in memory 904 in advance, and reads and acquires set value Tdm of lights-out delay duration corresponding to set value Tam of lighting duration of light 907 by referring to this lights-out delay duration table 170.

In addition, in a second setting method, processor 901 measures lighting duration Ta of light 907 and calculates a predetermined proportion of measured lighting duration Ta (for example, 10% of the measured value of lighting duration Ta) to set the calculated value as set value Tdm of lights-out delay duration. The predetermined proportion is not limited to 10%, and may be set to any value including 5% and 20%.

In addition, set value Tdm of lights-out delay duration may be set in motion sensor light 90 via master device 10 by the user who operates smartphone 50 inputting a setting. For example, once information of set value Tdm of lights-out delay duration input by a setting operation carried out by the user who operates smartphone 50 is transmitted from smartphone 50 to master device 10, master device 10 receives the information of set value Tdm of lights-out delay duration. After then, master device 10 transmits the information of set value Tdm of lights-out delay duration to motion sensor light 90. Once motion sensor light 90 receives the information of set value Tdm of lights-out delay duration, the setting can be completed by writing the information in memory 904.

In addition, for example, a case where human movement is no longer detected at last at a time when lighting duration Ta, during which the light is on, has passed 70 seconds although set value Tam of lighting duration of light 907 is 20 seconds, and after then, a non-detection state continues for lights-out delay duration is assumed. In this case, according to the first setting method, set value Tdm of lights-out delay duration is 5 seconds when lights-out delay duration table 170 is referred. Meanwhile, according to the second setting method, set value Tdm of lights-out delay duration is 7 seconds, which is 10% of measured value of lighting duration Ta. Accordingly, while light 907 has been turned on for 75 seconds in total according to the first setting method, light 907 has been turned on for 77 seconds in total according to the second setting method. That is, in a case where set value Tdm of lights-out delay duration is set according to the first setting method, time duration for which light 907 has been turned on reduces by 2 seconds compared to a case where set value Tdm of lights-out delay duration is set according to the second setting method. Thus, the first setting method is preferable to the second setting method in that power consumption of motion sensor light 90 driven by a battery decreases. Meanwhile, in a case where set value Tdm of lights-out delay duration is set according to the second setting method, light 907 has been turned on 2 seconds longer compared to a case where set value Tdm of lights-out delay duration is set according to the first setting method. Thus, the second setting method is preferable to the first setting method from a perspective of securing lighting duration of light 907 to a certain extent.

In addition, for example, a case where set value Tam of lighting duration of light 907 is 20 seconds, human movement is no longer detected at last at a time when lighting duration Ta, during which the light is on, has passed 20 seconds, and after then, a non-detection state continues for lights-out delay duration is assumed. In this case, according to the first setting method, set value Tdm of lights-out delay duration is 5 seconds when lights-out delay duration table 170 is referred. Meanwhile, according to the second setting method, set value Tdm of lights-out delay duration is 2 seconds, which is 10% of the measured value of lighting duration Ta. Accordingly, while light 907 is to be turned on for 25 seconds in total according to the first setting method, light 907 is to be turned on for 22 seconds in total according to the second setting method. That is, a determination as to which method is better, between the first setting method and the second setting method, to set set value Tam of lights-out delay duration depends on the length of lighting duration Ta of light 907 by a time point when movement of a person is no longer detected. Set value Tam of lights-out delay duration is set according to any setting method of the first setting method and the second setting method.

The first setting method or the second setting method can be selected, as a method for setting set value Tdm of lights-out delay duration, by smartphone 50 via an operation switch (not illustrated) mounted in motion sensor light 90 or via master device 10.

Light 907 is configured with, for example, a white LED, which is a light source, and a reflector which reflects, toward the front, light projected from the white LED. The light source is not limited to the white LED, and may be a colored LED other than white, an incandescent lamp, a fluorescent lamp, a halogen lamp, and a xenon lamp. In the present exemplary embodiment, for example, a white LED which has low power consumption and similar to natural light is used.

Memory 904 stores a control program executed by processor 901 and various types of data. The various types of data include setting information table 160 and lights-out delay duration table 170 which will be described later.

Illuminance sensor 905, which is an example of the sensor, senses the brightness of the surroundings, and is a photodiode that senses light in a wavelength region close to wavelength of light which is perceivable by the human eye, that is, that has spectral sensitivity similar to that of the human eye. An image sensor may be used as the illuminance sensor, and in this case, illuminance can be acquired from a luminance value of each pixel of the image sensor and an image can also be acquired from luminance values of the entire pixels.

Motion sensor 906, which is an example of the sensor, has an LED and a photodiode. The monitoring area is irradiated with near infrared light from the LED, and the reflected light is received by the photodiode. Based on changes in the reflected light, human movement is detected. Herein, although human movement has been detected as an example of the moving object, without being limited to a human, the movement of an animal, including a dog and a cat, and the movement of a structure, including a small or large vehicle and a robot, may be detected. In addition, herein, near infrared light has been irradiated. However, the monitoring area may be irradiated with visible light, ultraviolet light, or the like and the movement of the moving object may be detected from changes in the reflected light. In addition, instead of the monitoring area being irradiated with light, the monitoring area may be irradiated with ultrasonic waves, and the movement of the moving object may be detected from the reflected waves. In addition, the motion sensor has detected the movement of the moving object. However, in a case of a moving object of which movement is predicted to be extremely small, a sensor that can detect the presence of the moving object even if the moving object does not move may be used. For example, a motion sensor that senses infrared light emitted by a human body and an infrared radiation sensor (pyroelectric sensor) that is a passive infrared (PIR) sensor may be used as the motion sensor. In a case where the pyroelectric sensor is used, power conservation is achieved since the pyroelectric sensor does not emit light unlike the LED.

Battery 908 refers to, for example, four D batteries that are used as a power supply of motion sensor light 90. Not only primary batteries, including a manganese dry battery and an alkaline dry battery, but also chargeable secondary batteries, including a nickel-hydrogen battery, a lithium-ion battery, and lead batter, may be used as the battery. In addition, in the present exemplary embodiment, the battery has been used as the power supply of motion sensor light 90. Instead of the battery, however, a power supply device that is connected to a commercial alternating current power supply and converts a commercial alternating current to output a predetermined voltage may be mounted.

Figure 9:
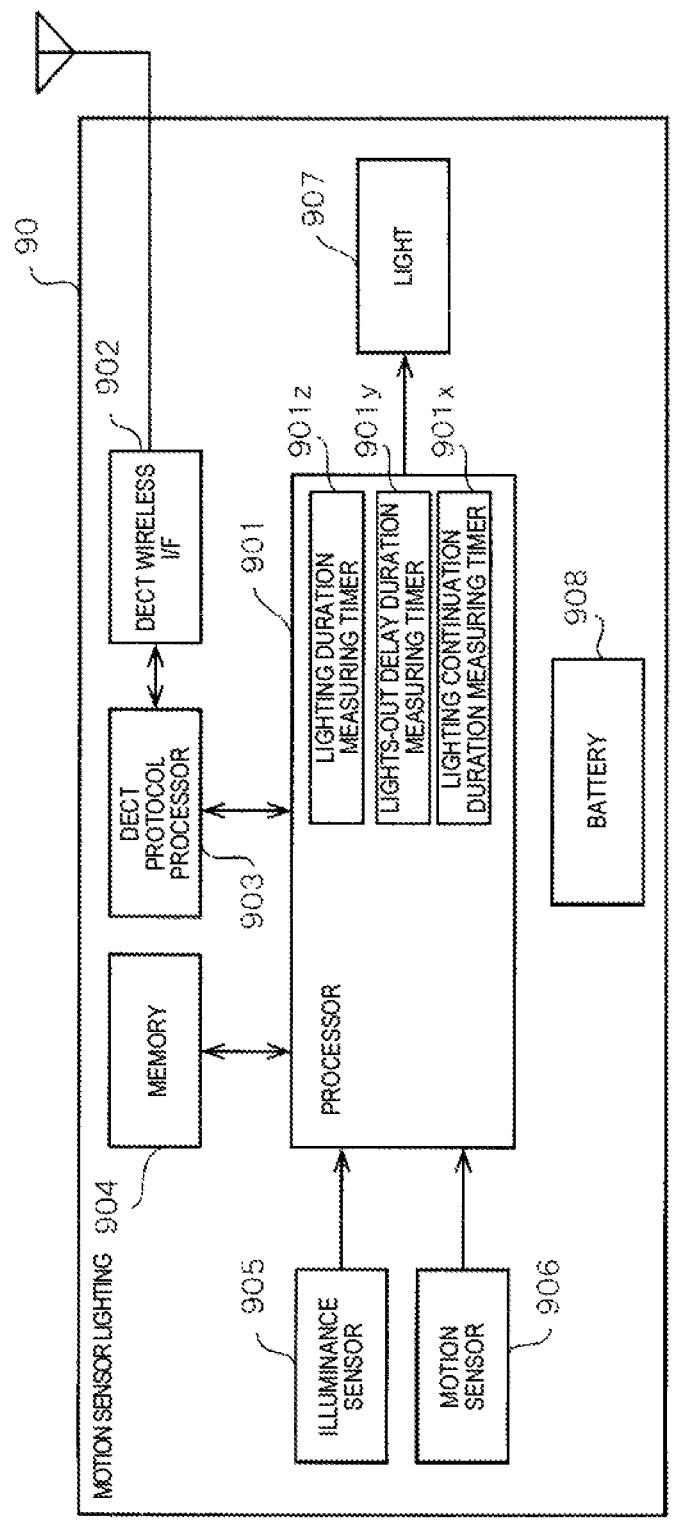
FIG. 9 is a block diagram illustrating an example of an internal configuration of the motion sensor light in the surveillance camera system according to the present exemplary embodiment.

FIG. 9 is a block diagram illustrating an example of an internal configuration of motion sensor light 90 in surveillance camera system 5 according to the present exemplary embodiment. Motion sensor light 90 has a configuration in which processor 901, DECT wireless I/F 902, DECT protocol processor 903, memory 904, illuminance sensor 905, motion sensor 906, light 907, and battery 908 are included.

Processor 901 carries out wireless connection and wireless communication with master device 10 using wireless communication system of DECT via DECT wireless I/F 902 and DECT protocol processor 903. Motion sensor light 90 can be connected to devices, including various types of sensors 40, smartphone 50, and smart plug 80, by wirelessly communicating with master device 10.

In addition, lighting duration measuring timer 901$z$, lights-out delay duration measuring timer 901$y$, and lighting continuation duration measuring timer 901$x$ are mounted in processor 901.

Lighting duration measuring timer 901$z$ measures lighting duration of light 907. Hereinafter, "Ta" will be used as a reference sign of a measured value of lighting duration, and "Tam" will be used as a reference sign of a set value of lighting duration.

Lights-out delay duration measuring timer 901$y$ measures lights-out delay duration. Lights-out delay duration refers to time duration for a moving object non-detection state from a time when movement of a moving object (for example, a human) is no longer detected by motion sensor 906 to a time when light 907 is turned off. Hereinafter, "Td" will be used as a reference sign of a measured value of lights-out delay duration, and "Tdm" will be used as a reference sign of a set value of lights-out delay duration.

Lighting continuation duration measuring timer 901$x$ measures lighting continuation duration that indicates duration for which light 907 is continued to be turned on after being initiated to be turned on. An upper limit is provided for the lighting continuation duration. The upper limit set to a maximum value of lighting duration during which light 907 can constantly stay turned on, considering that motion sensor light 90 is driven by a battery. In a case where light 907 has been turn on up to the upper limit, light 907 is forcibly turned off by processor 901. Hereinafter, "Tc" will be used as a reference sign of a measured value of lighting continuation duration, and "Tcm" will be used as a reference sign of a set value of lighting continuation duration (that is, the aforementioned upper limit). The lighting duration measured by lighting duration measuring timer 901$z$ can be used as the lighting continuation duration, and in this case, lighting continuation duration measuring timer 901$x$ may be omitted from motion sensor light 90.

Once measured value Tc of lighting continuation duration of light 907 measured by lighting continuation duration measuring timer 901$x$ exceeds set value Tcm of lighting continuation duration (that is, the aforementioned upper limit) stored in memory 904, processor 901 forcibly turns off light 907 regardless of the condition of measured value Td of lights-out delay duration.

In addition, as will be described later, processor 901 compares measured value Td of lights-out delay duration measured by lights-out delay duration measuring timer 901$y$ with set value Tdm of lights-out delay duration stored in memory 904, and controls turning on or turning off of light 907 according to the comparison results.

In a case where light 907 detects a human during lights-out, processor 901 initiates measurement of lighting duration of light 907 and initiates lighting of light 907.

Processor 901 turns off light 907 in a case where it is determined that measured value Td of lights-out delay duration exceeds set value Tdm of lights-out delay duration and measured value Ta of lighting duration of light 907 exceeds set value Tam of lighting duration of light 907 during lighting of light 907. For example, a case where a human is no longer detected at a time point when set value Tam of lighting duration of light 907 is 30 seconds, set value Tdm of lights-out delay duration is 5 seconds, and measured value Ta of lighting duration of light 907 is 25 seconds is considered. In this case, once a human non-detection state continues for 5 seconds since a human has been no longer detected, light 907 is turned off since measured value Td of lights-out delay duration has reached set value Tdm of lights-out delay duration (5 seconds) and measured value Ta of lighting duration of light 907 has reached set value Tam of lighting duration of light 907 (30 seconds). In this example, light 907 had been turned on for 30 seconds in total.

In addition, processor 901 is capable of communicating with master device 10 by using wireless communication system of DECT since motion sensor light 90 is driven by a battery. However, processor 901 is set to stay in a communication sleep mode (that is, a mode in which communication is not carried out), excluding a time when wireless communication with master device 10 is required to be carried out (for example, human detection time and periodic communication time with master device 10). Accordingly, motion sensor light 90 can restrict an increase in power consumption since motion sensor light 90 is not required to be set to an ordinary communication mode with master device 10.

In the present exemplary embodiment, set value Tdm of lights-out delay duration can be set, for example, by means of two methods. In the first setting method, processor 901 stores lights-out delay duration table 170 (refer to FIG. 14) in memory 904 in advance, and reads and acquires set value Tdm of lights-out delay duration corresponding to set value Tam of lighting duration of light 907 by referring to this lights-out delay duration table 170.

In addition, in the second setting method, processor 901 measures the lighting duration of light 907 and calculates a predetermined proportion of the measured value Ta (for example, 10% of measured value Ta of lighting duration) to set the calculated value as set value Tdm of lights-out delay duration. The predetermined proportion is not limited to 10%, and may be set to any value including 5% and 20%.

In addition, set value Tdm of lights-out delay duration may be set in motion sensor light 90 via master device 10 by the user who operates smartphone 50 inputting a setting. For example, once information of set value Tdm of lights-out delay duration input by a setting operation carried out by the user who operates smartphone 50 is transmitted from smartphone 50 to master device 10, master device 10 receives the information of set value Tdm of lights-out delay duration. After then, master device 10 transmits the information of set value Tdm of lights-out delay duration to motion sensor light 90. Once motion sensor light 90 receives the information of set value Tdm of lights-out delay duration, the setting can be completed by writing the information in memory 904.

In addition, for example, a case where human movement is no longer detected at last at a time when measured value Ta of lighting duration, during which the light has been turned on, has passed 70 seconds although set value Tam of lighting duration of light 907 is 20 seconds, and after then, a non-detection state continues for lights-out delay duration is assumed. In this case, according to the first setting method, set value Tdm of lights-out delay duration is 5 seconds when lights-out delay duration table 170 is referred. Meanwhile, according to the second setting method, set value Tdm of lights-out delay duration is 7 seconds, which is 10% of measured value Ta of lighting duration until human movement is no longer detected. Accordingly, while light 907 has been turned on for 75 seconds in total according to the first setting method, light 907 has been turned on for 77 seconds in total according to the second setting method. That is, in a case where set value Tdm of lights-out delay duration is set according to the first setting method, duration for which light 907 has been turn on reduces by 2 seconds compared to a case where set value Tdm of lights-out delay duration is set according to the second setting method. Thus, the first setting method is preferable in that power consumption of motion sensor light 90 driven by a battery decreases. Meanwhile, in a case where set value Tdm of lights-out delay duration is set according to the second setting method, light 907 has been turned on 2 seconds longer compared to a case where set value Tdm of lights-out delay duration is set according to the first setting method. Thus, the second setting method is preferable to the first setting method from a perspective of securing lighting duration of light 907 to a certain extent even if human movement is no longer detected.

In addition, for example, a case where the movement of a person is no longer detected at last at a time when measured value Ta of lighting duration, during which the light has been turned on, has passed 20 seconds although set value Tam of lighting duration of light 907 is 20 seconds, and after then, a non-detection state continues for lights-out delay duration is assumed. In this case, according to the first setting method, set value Tdm of lights-out delay duration is 5 seconds when lights-out delay duration table 170 is referred. Meanwhile, according to the second setting method, set value Tdm of lights-out delay duration is 2 seconds, which is 10% of measured value Ta of lighting duration. Accordingly, while light 907 is to be turned on for 25 seconds in total according to the first setting method, light 907 is to be turned on for 22 seconds in total according to the second setting method. That is, a determination as to which method is better, between the first setting method and the second setting method, to set set value Tdm of lights-out delay duration depends on the length of measured value Ta of lighting duration of light 907 by a time point when movement of a person is no longer detected. Set value Tdm of lights-out delay duration is set according to any setting method of the first setting method and the second setting method.

The first setting method or the second setting method can be selected, as a method for setting lights-out delay duration, by smartphone 50 via the operation switch (not illustrated) mounted in motion sensor light 90 or via master device 10.

Light 907 is configured with, for example, a white LED, which is a light source, and a reflector which reflects, toward the front, light projected from the white LED. The light source is not limited to the white LED, and may be a colored LED other than white, an incandescent lamp, a fluorescent lamp, a halogen lamp, and a xenon lamp. In the present exemplary embodiment, the white LED which has low power consumption and similar to natural light is used.

Memory 904 stores a control program executed by processor 901 and various types of data. The various types of data include setting information table 160 and lights-out delay duration table 170 which will be described later.

Illuminance sensor 905, which is an example of the sensor, senses the brightness of the surroundings, and is a photodiode that senses light in a wavelength region close to wavelength of light which is perceivable by the human eye, that is, that has spectral sensitivity similar to that of the human eye. An image sensor may be used as illuminance sensor 905, and in this case, illuminance can be acquired from a luminance value of each pixel of the image sensor and an image can also be acquired from luminance values of the entire pixels.

Motion sensor 906, which is an example of the sensor, has an LED and a photodiode. The monitoring area is irradiated with near infrared light from the LED, and the reflected light is received by the photodiode. Based on changes in the reflected light, human movement is detected. Herein, although human movement has been detected as an example of the moving object, without being limited to a human, the movement of an animal, including a dog and a cat, and the movement of a structure, including a small or large vehicle and a robot, may be detected. In addition, herein, near infrared light has been irradiated. However, the monitoring area may be irradiated with visible light, ultraviolet light, or the like and the movement of the moving object may be detected from changes in the reflected light. In addition, instead of the monitoring area being irradiated with light, the monitoring area may be irradiated with ultrasonic waves, and the movement of the moving object may be detected from the reflected waves. In addition, motion sensor 906 has detected the movement of the moving object. However, in a case of a moving object of which movement is predicted to be extremely small, a sensor that can detect the presence of the moving object even if the moving object does not move may be used. For example, a motion sensor that senses infrared light emitted by a human body and an infrared radiation sensor (pyroelectric sensor) that is a passive infrared (PIR) sensor may be used as motion sensor 906. In a case where the pyroelectric sensor is used, power conservation is achieved since the pyroelectric sensor does not emit light unlike the LED.

Battery 908 refers to, for example, four D batteries that are used as a power supply of motion sensor light 90. Not only primary batteries, including a manganese dry battery and an alkaline dry battery, but also chargeable secondary batteries, including a nickel-hydrogen battery, a lithium-ion battery, and lead batter, may be used as the battery. In addition, in the present exemplary embodiment, the battery has been used as the power supply of the motion sensor light 90. Instead of the battery, however, a power supply device that is connected to a commercial alternating current power supply and converts a commercial alternating current to output a predetermined voltage may be mounted.

Figure 10:
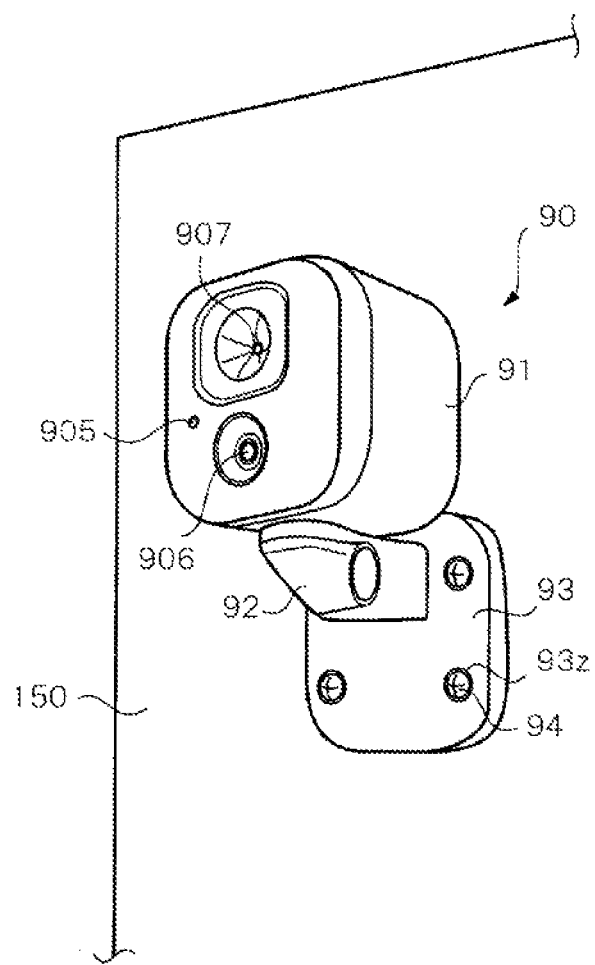
FIG. 10 is a perspective view illustrating an example of an appearance of the motion sensor light according to the present exemplary embodiment.

FIG. 10 is a perspective view illustrating an example of an appearance of motion sensor light 90 according to the present exemplary embodiment. Motion sensor light 90 has light body 91, connection unit 92, and pedestal 93. A board in which electrical components of each unit illustrated in FIG. 8 are provided is mounted in light body 91. Light 907 that is capable of emitting light toward the monitoring area is disposed on the front surface of light body 91. In addition, illuminance sensor 905 and motion sensor 906 are disposed on the front surface of light body 91.

Pedestal 93 is a rectangular plate that supports light body 91 via connection unit 92. The rectangular plate has a shape of which four corners are round (R-shape). Hole 93z into which a screw is inserted is drilled in the four corners of pedestal 93.

Connection unit 92 connects light body 91 and pedestal 93, and has a hinge mechanism that is capable of manually adjusting an orientation of light body 91 with respect to pedestal 93 step by step. Even if pedestal 93 is attached to a member with a surface (for example, a horizontal surface, a vertical surface, and an inclined surface) having any angle, the front surface of light body 91 can face a desirable direction in the monitoring area by the hinge mechanism being adjusted. In the present exemplary embodiment, motion sensor light 90 is attached to outer wall 150 of a house. In the attaching of motion sensor light 90, pedestal 93 of motion sensor light 90 is fixed to outer wall 150 by screw 94 being passed through and fastened to four holes 93z provided in pedestal 93. After being attached, the orientation of light body 91 is adjusted by manually moving connection unit 92 such that monitoring area (for example, in front of a porch, a garden, a garage, and the like) can be irradiated with light 907. Without being limited to the outer wall of the house, which is outside the house, the place for attaching the motion sensor light may be a veranda, a door, a column, and the like, and may be a storage inside the house.

An operation of motion sensor light 90 in surveillance camera system 5 having the aforementioned configuration will be described.

First, setting information table 160 and lights-out delay duration table 170 stored in memory 904, which are data required for the operation of motion sensor light 90, will be described.

FIG. 11 is a view illustrating an example of a registration content of setting information table 160 of motion sensor light 90 according to the present exemplary embodiment. Setting information table 160 is stored in advance in memory 904 of motion sensor light 90, for example, at a time of manufacturing. The registration content of setting information table 160 may be changed by means of the operation switch (not illustrated) provided in motion sensor light 90, and may be rewritten via master device 10 by the user operating smartphone 50.

In setting information table 160, items of lighting duration, lighting pattern, lighting luminance, illuminance sensor sensitivity, and motion sensor sensitivity are registered. In the item of "lighting duration", duration for which light 907 has been turned on when motion sensor 906 detects movement of a human or the like, that is, set value Tam of lighting duration set in advance, is set. The setting range thereof is 0 second to 3 minutes, and an initial value of set value Tam of lighting duration is "20 seconds".

In the item of "lighting pattern", continuous lighting or flashing is set as a way of shining in a case where light 907 is turned on. The initial value thereof is set to "continuous lighting". In the item of "lighting luminance", brightness in a case where light 907 is turned on is set. The setting range thereof is 100 to 300 lumens. The initial value thereof is set to "300 lumens".

In the item of "illuminance sensor sensitivity", the sensitivity of illuminance sensor 905 is set to ensure that the light does not shine when it is bright in the daytime or the like even if movement of a person is detected by motion sensor 906. The setting range thereof includes three stages, including "bright" (initiates lighting even though it is slightly brighter compared to "normal"), "normal" (initiates lighting since it has become dim), and "dark" (initiates lighting since it has become slightly darker compared to "normal"). The initial value thereof is "normal".

In the item of "motion sensor sensitivity", the detection sensitivity of the motion sensor is set. The setting range thereof includes four stages, including "high" (likely to respond even to a smaller motion compared to "medium"), "medium" (moderate response), "low" (less likely to respond compared to "medium"), and "extremely low" (significantly less likely to respond compared to "medium"). The initial value thereof is "medium".

Without being limited to the above five items, other items, for example, a setting change according to weather (the light is always turned off in case of rain), a daily limit on the number of times the light is turned on, a flashing cycle during flashing, and a luminance change pattern during lighting, may be included as items to be registered in setting information table 160.

FIG. 12 is a view illustrating an example of the registration content of setting information table 160 of motion sensor light 90 in the present exemplary embodiment. Setting information table 160 is stored in advance in memory 904 of motion sensor light 90, for example, at a time of manufacturing. The registration content of setting information table 160 may be changed by means of the operation switch (not illustrated) provided in motion sensor light 90, and may be rewritten via master device 10 by the user operating smartphone 50.

In setting information table 160, items of "lighting duration", "lighting pattern", "lighting luminance", "illuminance sensor sensitivity", and "motion sensor sensitivity" are registered. In the item of "lighting duration", duration for which light 907 has been turned on when motion sensor 906 detects movement of a human or the like, that is, set value Tam of lighting duration, is set. The setting range thereof is, for example, 0 second to 3 minutes, and an initial value of set value Tam of lighting duration is "20 seconds".

In the item of "lighting pattern", "continuous lighting" or "flashing" is set as a way of shining in a case where light 907 is turned on. The initial value thereof is set to "continuous lighting". In the item of "lighting luminance", brightness in a case where light 907 is turned on is set. The setting range thereof is, for example, 100 to 300 lumens. The initial value thereof is set to "300 lumens".

In the item of "illuminance sensor sensitivity", the sensitivity of illuminance sensor 905 is set to ensure that the light does not shine when it is bright in the daytime or the like even if movement of a person is detected by motion sensor 906. The setting range thereof includes three stages, including "bright" (initiates lighting even though it is slightly brighter compared to "normal"), "normal" (initiates lighting since it has become dim), and "dark" (initiates lighting since it has become slightly darker compared to "normal"). The initial value thereof is "normal".

In the item of "motion sensor sensitivity", the detection sensitivity of the motion sensor is set. The setting range thereof includes four stages, including "high" (likely to respond even to a smaller motion compared to "medium"), "medium" (moderate response), "low" (less likely to respond compared to "medium"), and "extremely low" (significantly less likely to respond compared to "medium"). The initial value thereof is "medium".

In the item of "lighting continuation duration", an upper limit for duration until motion sensor light 90 is forcibly turned off since motion sensor light 90 has been continued to be turned on is set. The setting range includes duration that can be set, for example, 5 minutes to 30 minutes. The initial value thereof is "15 minutes".

Without being limited to the above six items, other items, for example, a setting change according to weather (the light is always turned off in case of rain), a daily limit on the number of times the light is turned on, a flashing cycle during flashing, and a luminance change pattern during lighting, may be included as items to be registered in setting information table 160.

The operation of surveillance camera system 5 having the aforementioned configuration will be described.

Smart control setting table 180 in which an operation condition (that is, a scenario) of each device that configures surveillance camera system 5 will be described. Smart control setting table 180 is, for example, stored in storage 103 of master device 10. The initial value of smart control setting table 180 is registered, for example, at a time of manufacturing or at a time of maintenance. In addition, the registration content of smart control setting table 180 can be added, updated, and deleted at any time by the user operating smartphone 50 to register a scenario in master device 10. That is, once the user operates an external device, including smartphone 50, to create a scenario, the external device transmits the data of the scenario to master device 10. Master device 10 receives the data of the scenario transmitted from the external device and rewrites the data to register in storage 103. In addition, once the user operates display 106 (for example, a touch panel) of master device 10 to create a scenario, master device 10 rewrites and registers, in storage 103, the data of the scenario input in display 106. Accordingly, the user can add, update, and delete the content of smart control setting table 180 at any time, without being limited to the aforementioned time of manufacturing or time of maintenance.

FIG. 13 is a view illustrating an example of a registration content of smart control setting table 180. In smart control setting table 180, items, including "activation trigger", "operating device", "operation content", "operation initiation condition", and "operation content (detailed)", are registered for each scenario number. Herein, the scenario refers to setting content of a series of processes (smart control) in which an operating device executes processing in operation content (specifically, processing shown in "operation content (detailed)") once an operation initiation condition is satisfied at a time when an activation trigger is processed.

In a scenario number 1, a scenario is registered, in which a motion picture imaged by camera 30 (for example, indoor camera 30A) is recorded for 3 minutes in a case where an operation initiation condition (arm mode: away arm or at home arm, and operation time slot: all day, and repeat: every day) is satisfied at a time when open and closed states sensor 40D attached to a window is opened. That is, this scenario shows processing content where camera 30 (for example, indoor camera 30A) that is disposed so as to image the window as an imaging area initiates imaging and further records the imaged motion picture for 3 minutes once the window is opened in an away arm or at home arm, for example, once a thief intruded. Accordingly, a motion picture of the window opened in the arm mode can be obtained as evidence.

In a scenario number 2, a scenario is registered, in which smart plug 80 closes switch 850 and a power supply of an electrical device connected to outlet terminal 852 is turned on for 10 minutes in a case where an operation condition (arm mode: all modes, operation time slot: 22:00 to 6:00 the next day, and repeat: Mon. to Fri.) is satisfied at a time when motion sensor 906 of motion sensor light 90 detects movement of a person (that is, a human). That is, this scenario shows processing content where smart plug 80 connected to the electrical device (for example, a stand light) is turned on for 10 minutes once motion sensor light 90 detects movement of a person at night. Accordingly, it can appear that there is a person even at night as well.

In a scenario number 3, motion sensor light 90 is turned on and flashes at a luminance of 300 lumens for 10 seconds in a case where an operation condition (arm mode: all modes, operation time slot: 22:00 to 6:00 the next day, and repeat: every day) is satisfied at a time when infrared radiation sensor 313 of surveillance camera 30B provided outdoors detects a human. That is, this scenario shows processing content where motion sensor light 90 flashes at a luminance of 300 lumens for 10 seconds once surveillance camera 30B detects the movement of a person (human) at night. Accordingly, warning a person who is in a human detection area of outdoor surveillance camera 30B at night is possible. These scenarios are merely examples, and it is needless to say that any scenario may be registered. For example, a scenario in which motion sensor light 90 is turned on or turned off in accordance with time and date, weather, day, and the like designated by the user operating smartphone 50 may be registered in smart control setting table 180. Accordingly, master device 10 can give motion sensor light 90 a lighting command or a lights-out command in a case where a scenario is satisfied.

Figure 14:
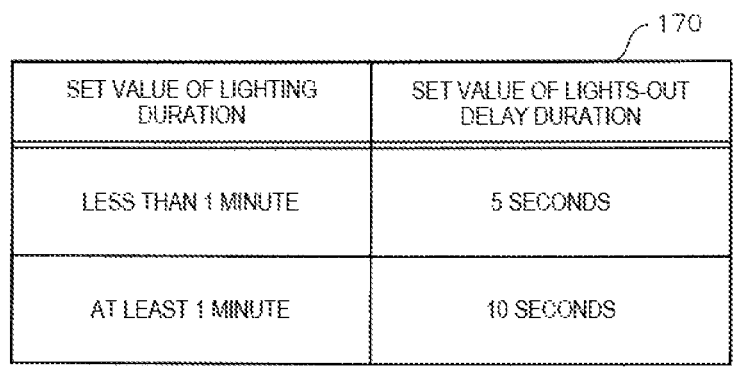
FIG. 14 is a view illustrating an example of a registration content of a lights-out delay duration table of the motion sensor light according to the present exemplary embodiment.

FIG. 14 is a view illustrating an example of a registration content of lights-out delay duration table 170 of motion sensor light 90 according to the present exemplary embodiment. Lights-out delay duration table 170 is stored in advance in memory 904 of motion sensor light 90. The registration content of lights-out delay duration table 170 may be changed by means of the operation switch provided in motion sensor light 90, and may be rewritten via master device 10 by the user operating smartphone 50.

In lights-out delay duration table 170, set value Tdm of lights-out delay duration corresponding to the set value Tam of lighting duration of light 907 set by the user is registered. Specifically, set value Tdm of lights-out delay duration is 5 seconds in a case where set value Tam of lighting duration is smaller than 1 minute. In addition, set value Tdm of lights-out delay duration is 10 seconds in a case where set value Tam of lighting duration is at least 1 minute. These values are merely examples, and any value can be set.

Furthermore, smart control setting table 180 in which an operation condition (that is, a scenario which will be described later) of each device that configures surveillance camera system 5 will be described. Smart control setting table 180 is, for example, stored in storage 103 of master device 10. The initial value of smart control setting table 180 is registered, for example, at a time of manufacturing or at a time of maintenance. In addition, the registration content of smart control setting table 180 can be added, updated, and deleted at any time by the user operating smartphone 50 to register a scenario in master device 10. That is, once the user operates an external device, including smartphone 50, to create a scenario, the external device transmits the data of the scenario to master device 10. Master device 10 receives the data of the scenario transmitted from the external device and rewrites the data to register in storage 103. In addition, once the user operates display 106 (for example, a touch panel) of master device 10 to create a scenario, master device 10 rewrites and registers, in storage 103, the data of the scenario input in display 106. Accordingly, the user can add, update, and delete the content of smart control setting table 180 at any time, without being limited to the aforementioned time of manufacturing or time of maintenance.

Figure 15:
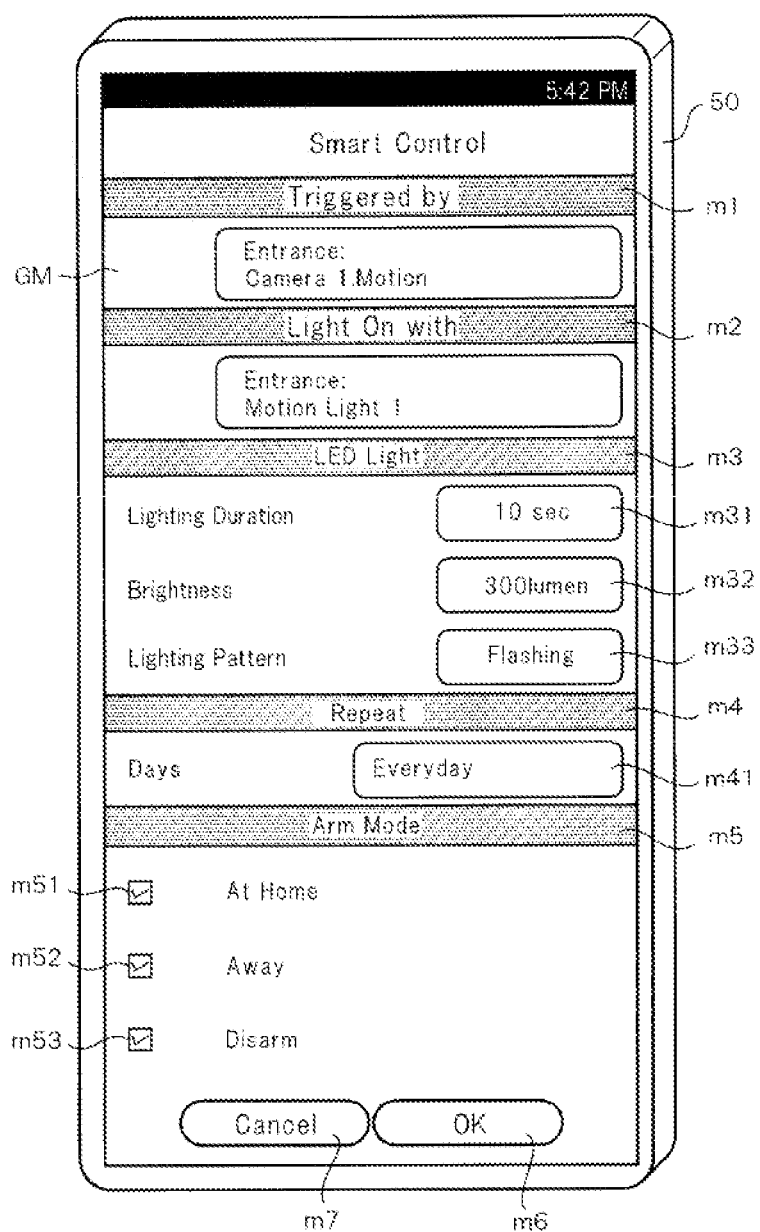
FIG. 15 is a view illustrating an example of a smart control setting screen displayed on the smartphone.

FIG. 15 is a view illustrating an example of smart control setting screen GM displayed on smartphone 50. In smart control setting screen GM, setting items of a scenario for turning on motion sensor light 90 is displayed.

In item m1 of activation trigger (Triggered by), for example, a time when a surveillance camera (Entrance: Camera 1. Motion) provided in front of the porch has detected a human is set.

In item m2 of operation content (Light On with), for example, an operation of turning on a motion sensor light (Entrance Motion Light 1) provided in front of the porch is set.

As one piece of operation content (detailed), for example, input item m31 of lighting duration (Lighting Duration), input item m32 of brightness (Brightness), and item m33 of pattern (Lighting Pattern) can be set in item m3, which is the way of lighting of an LED (LED Light). Herein, the lighting duration is set to 10 seconds, the brightness is set to 300 lumens, and the pattern is set to flashing (Flashing).

In addition, item m4 of repeat (Repeat) can be set as one of operation initiation conditions. Herein, input item m41 of day (Days) is set to every day (Everyday).

In addition, item m5 of arm mode (Arm Mode) in which a scenario is executed can be set as one of operation initiation conditions. An arm mode is set by checking off each of item m51 of at home arm mode (At Home Mode), item m52 of away arm mode (Away Mode), and item m53 of arm release mode (Disarm Mode). In a case where all items m51, m52, and m53 are checked off, all modes are set. Herein, all modes are set.

The arm mode corresponds to an operation state of master device 10 in surveillance camera system 5. The user selects from the three modes and sets one mode.

In the at home arm mode (At Home Mode), master device 10 outputs an alarm sound, and notifies the user of the occurrence of an abnormality by means of smartphone 50 that belongs to the user, for example, even in a case where a window is opened although the user, who is a resident, is at home.

In the away arm mode (Away Mode), master device 10 outputs an alarm sound, and notifies the user of the occurrence of an abnormality by means of smartphone 50 that belongs to the user, for example, in a case where a window is opened when the user, who is a resident, is away home.

In the arm release mode (Disarm Mode), master device 10 does not output an alarm sound, and does not notify the user of the occurrence of an abnormality by means of smartphone 50 that belongs to the user, for example, in a case where a window is opened even when the user, who is a resident, is away home.

In addition, OK button m6 and Cancel button m7 are provided on smart control setting screen GM. The user presses OK button m6 in a case where smart control setting table 180 stored in storage 103 of master device 10 is to be updated or to be newly added in terms of setting items on smart control setting screen GM. Meanwhile, the user presses Cancel button m7 in a case where the user doe not update or newly add.

Figure 16:
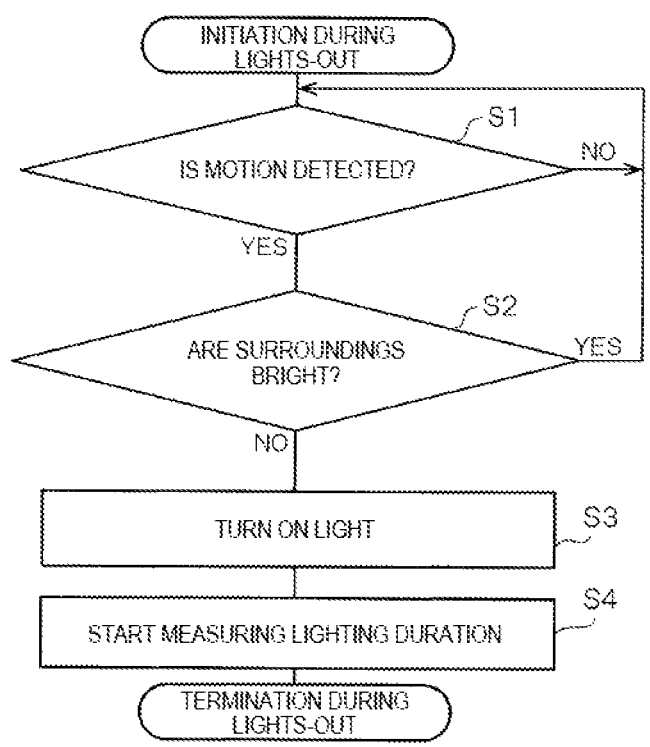
FIG. 16 is a flowchart describing an example of operation procedures during lights-out of the motion sensor light according to the present exemplary embodiment.

FIG. 16 is a flowchart describing an example of operation procedures during lights-out of motion sensor light 90 according to the present exemplary embodiment. The operation is repeated and executed by processor 901 of motion sensor light 90 during lights-out of light 907.

In FIG. 16, processor 901 determines whether or not movement of a person is detected by motion sensor 906 (S1). In a case where movement of a person is not detected (S1, NO), processor 901 repeats processing of Step S1.

Meanwhile, in a case where movement of a person is detected (S1, YES), processor 901 determines whether or not the surroundings are brighter than a set value, that is, whether or not the illuminance detected by illuminance sensor 905 satisfies a condition of set value ("bright", "normal", and "dark") in setting information table 160 (S2). In a case where the surroundings are brighter than the set value (S2, YES), processing of processor 901 returns to Step S1, and the same processing is repeated.

Meanwhile, in a case where the surroundings are darker than the set value (S2, NO), processor 901 turns on light 907 (S3). Furthermore, processor 901 starts lighting duration measuring timer 901z, and initiates the measurement of lighting duration Ta (S4). After then, processor 901 terminates processing during lights-out, and implements processing during lighting illustrated in FIG. 17.

Figure 17:
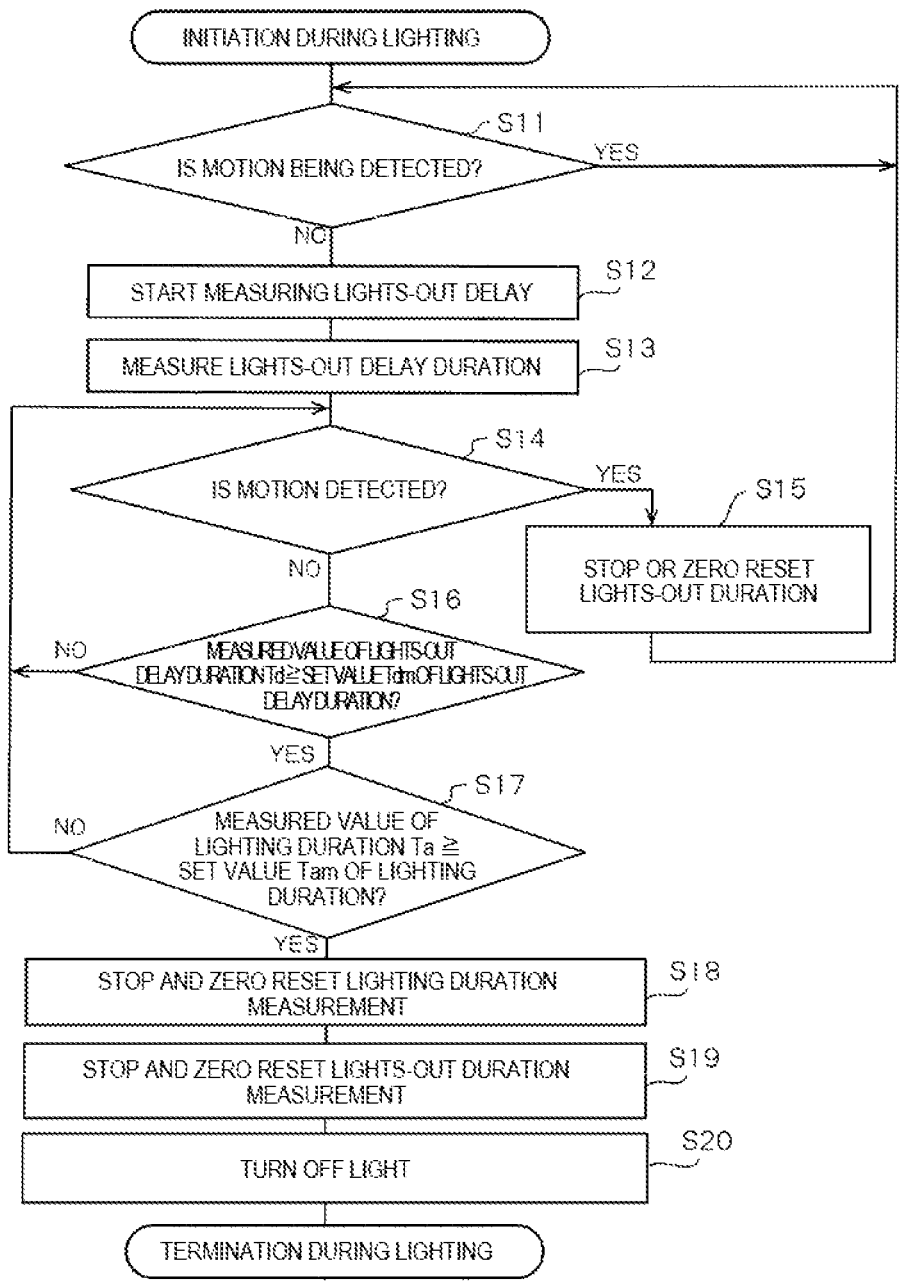
FIG. 17 is a flowchart describing an example of operation procedures during lighting of the motion sensor light according to the present exemplary embodiment.

FIG. 17 is a flowchart describing an example of operation procedures during lighting of motion sensor light 90 according to the present exemplary embodiment. The operation is repeated and executed by processor 901 of motion sensor light 90 during lighting of light 907.

In FIG. 17, processor 901 determines whether or not movement of a person is being detected by motion sensor 906 (S11). In a case where movement of a person is being detected (S11, YES), processor 901 repeats processing of Step S11.

Meanwhile, in a case where movement of a person is not being detected (S11, NO), processor 901 activates lights-out delay duration measuring timer 901y, and initiates the measurement of lights-out delay duration Td (S12). Processor 901 calculates set value Tdm of lights-out delay duration (S13). In the calculating of set value Tdm of lights-out delay duration, for example, according to the aforementioned first setting method, processor 901 acquires set value Tdm of lights-out delay duration (herein, 5 seconds or 10 seconds) corresponding to set value Tam of lighting duration by referring to lights-out delay duration table 170. Processor 901 may acquire set value Tdm of lights-out delay duration, using the second setting method.

Processor 901 determines whether or not movement of a person is detected again by motion sensor 906 (S14). In a case where movement of a person is detected (S14, YES), it means that the movement of the person who had been no longer detected since Step S11 is detected or the movement of another person is detected. Therefore, processor 901 stops the measurement of lights-out delay duration measuring timer 901y, and reset the measured value to 0 (S15). Then, processing of processor 901 returns to Step S11.

Meanwhile, in a case where movement of a person is not detected by motion sensor 906 in Step S14 (S14, NO), processor 901 determines whether or not lights-out delay duration Td measured by lights-out delay duration measuring timer 901y is equal to or greater than set value Tdm of lights-out delay duration acquired (calculated) in Step S13 (S16). In a case where lights-out delay duration Td is smaller than set value Tdm of lights-out delay duration (S16, NO), processing of processor 901 returns to Step S14.

Meanwhile, in a case where lights-out delay duration Td is equal to or greater than set value Tdm of lights-out delay duration (S16, YES), processor 901 determines whether or not the measured value of lighting duration Ta measured by lighting duration measuring timer 901z is equal to or greater than set value Tam of lighting duration registered in setting information table 160 (S17). In a case where the measured value of lighting duration Ta is smaller than set value Tam of lighting duration (S17, NO), processing of processor 901 returns to Step S14.

Meanwhile, in a case where the measured value of lighting duration Ta is equal to or greater than set value Tam of lighting duration (S17, YES), processor 901 stops the measurement of lighting duration measuring timer 901z, reset the measured value to 0 (S18), and stops the measurement of lights-out delay duration measuring timer 901y to reset the measured value to 0 (S19). Then, processor 901 turns off light 907 (S20). After then, processor 901 terminates processing during lighting, and implements processing during lights-out.

Hereinbefore, in motion sensor light 90 of the present exemplary embodiment, processor 901 turns on light 907 once motion sensor 906 detects movement of a person. Once light 907 is turned on, light 907 illuminates the monitoring area. Processor 901 initiates the measurement of lighting duration Ta of light 907. After then, in a case where the movement of a person is no longer detected, processor 901 initiates the measurement of lights-out delay duration Td and acquires set value Tdm of lights-out delay duration according to set value Tam of lighting duration of light 907. Processor 901 turns off light 907 in a case where the measured value of lights-out delay duration Td exceeds set value Tdm of lights-out delay duration and the measured value of lighting duration Ta of light 907 exceeds set value Tam of lighting duration.

Accordingly, turning on light 907 in a certain length of period can be compatible with restricting an increase in power consumption of motion sensor light 90 and turning off light 907 to the extent possible. In addition, after the movement of a person is detected and motion sensor light 90 is turned on, motion sensor light 90 can be prevented from being turned off immediately even if the movement of a person is no longer detected at a time when the set lighting duration has passed.

In addition, motion sensor light 90 is provided with memory 904 that correlates set value Tdm of lights-out delay duration with set value Tam of lighting duration of light 907 to store set value Tdm of lights-out delay duration. Processor 901 reads set value Tdm of lights-out delay duration stored in memory 904 based on set value Tam of lighting duration of light 907. By set value Tdm of lights-out delay duration correlated with set value Tam of lighting duration of light 907 being stored in memory 904 in advance, acquiring set value Tdm of lights-out delay duration becomes easier.

In addition, set value Tdm of lights-out delay duration is set to a length of time according to the length of set value Tam of lighting duration of light 907. Accordingly, set value Tdm of lights-out delay duration (that is, time duration for a person non-detection state from a time when movement of a person is no longer detected until when the light is turned off) can be altered such that set value Tam of lighting duration of light 907 becomes long enough or such that set value Tam of lighting duration of light 907 becomes short enough. Accordingly, since the longer set value Tam of lighting duration, the longer set value Tdm of lights-out delay duration becomes, motion sensor light 90 can be turned off sufficiently later than a time when the lighting duration has ended and a person has disappeared. In addition, since the shorter set value Tam of lighting duration, the shorter set value Tdm of lights-out delay duration becomes, a decrease in State of Charge of a battery can be restricted in a case where motion sensor light 90 is driven by the battery. In addition, even in a case where light 907 has been turned on sufficiently longer than set value Tam of lighting duration, an increase in power consumption of motion sensor light 90 can be restricted since a non-detection state continues for a short period of time, which is a set value of lights-out delay duration, after movement of a person is no longer detected and thus light 907 is immediately turned off.

In addition, processor 901 acquires, as set value Tdm of lights-out delay duration, a predetermined proportion of lighting duration Ta of light 907 at a time point when the movement of a person is no longer detected. Accordingly, processor 901 can set set value Tdm of lights-out delay duration in which the length of lighting duration of light 907 is considered.

In addition, after it is determined that the measured value of lights-out delay duration Td exceeds set value Tdm of lights-out delay duration, processor 901 determines whether or not the measured value of lighting duration Ta of light 907 exceeds set value Tam of lighting duration. Accordingly, even if movement of a person is no longer detected at a time when lighting duration Ta has ended, light 907 is not continued to be turned on for set value Tdm of lights-out delay duration. That is, by lighting duration Ta until then being added with set value Tdm of lights-out delay duration, continued lighting can be avoided and waste of power of motion sensor light 90 driven by a battery can be cut down.

Figure 18:
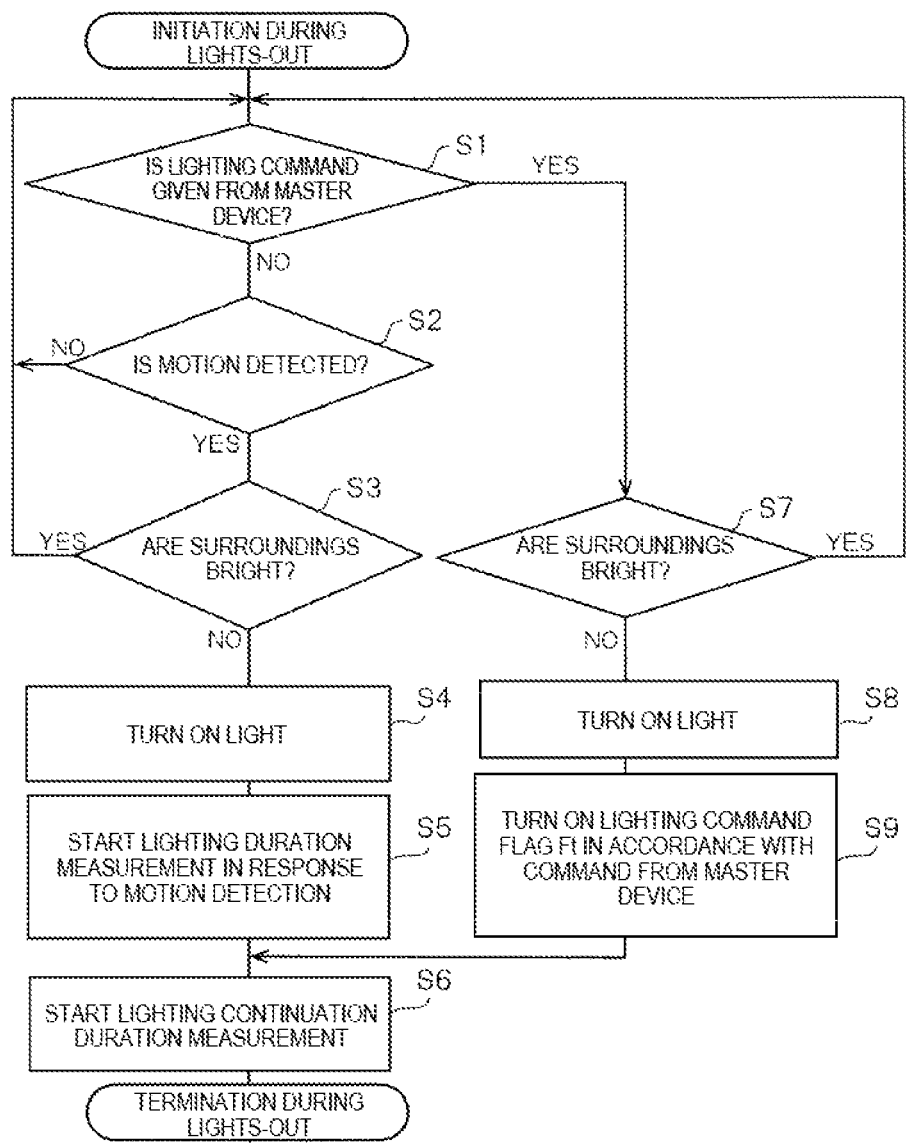
FIG. 18 is a flowchart describing an example of the operation procedures during lights-out of the motion sensor light according to the present exemplary embodiment.

FIG. 18 is a flowchart describing an example of operation procedures during lights-out of motion sensor light 90 according to the present exemplary embodiment. The operation is repeated and executed by processor 901 of motion sensor light 90 during lights-out of light 907.

In FIG. 18, processor 901 determines whether or not a lighting command is given from master device 10 (S1). In a case where it is determined that the lighting command is not given (S1, NO), processor 901 determines whether or not movement of a person is detected by motion sensor 906 (S2). In a case where it is determined that the movement of a person is not detected (S2, NO), processing of processor 901 returns to Step S1.

Meanwhile, in a case where it is determined that the movement of a person is detected (S2, YES), processor 901 determines whether or not the surroundings are brighter than a set value, that is, whether or not the illuminance detected by illuminance sensor 905 is higher than the set value (for example, "normal" out of "bright", "normal", and "dark") in setting information table 160 (S3). In a case where it is determined that the surroundings are brighter than the set value (S3, YES), processing of processor 901 returns to Step S1 since motion sensor light 90 is not required to be turned on.

Meanwhile, in a case where it is determined that the surroundings are darker than the set value (S3, NO), processor 901 turns on light 907 since motion sensor light 90 is required to be turned on (S4). Furthermore, processor 901 initiates the measurement of lighting duration by means of lighting duration measuring timer 901z almost simultaneously with the lighting of light 907 (S5). Furthermore, processor 901 initiates the measurement of lighting continuation duration by means of lighting continuation duration measuring timer 901x almost simultaneously with the lighting of light 907 (S6). After then, processor 901 terminates processing during lights-out, and implements processing during lighting.

Meanwhile, in a case where the lighting command is given from master device 10 in Step S1 (S1, YES), processor 901 determines whether or not the surroundings are brighter than the set value, as in Step S3 (S7). In a case where it is determined that the surroundings are brighter than the set value (S7, YES), processing of processor 901 returns to Step S1 since motion sensor light 90 is not required to be turned on.

Meanwhile, in a case where the surroundings are darker than the set value (S7, NO), processor 901 turns on light 907 (S8). Furthermore, processor 901 turns on lighting command flag Ft that signifies information indicating that light 907 is turned on based on the lighting command from master device 10 (S9). After then, processing of processor 901 proceeds to Step S6, and processor 901 initiates the measurement of the aforementioned lighting continuation duration. After then, processor 901 terminates processing during lights-out, and implements processing during lighting.

Figure 19:
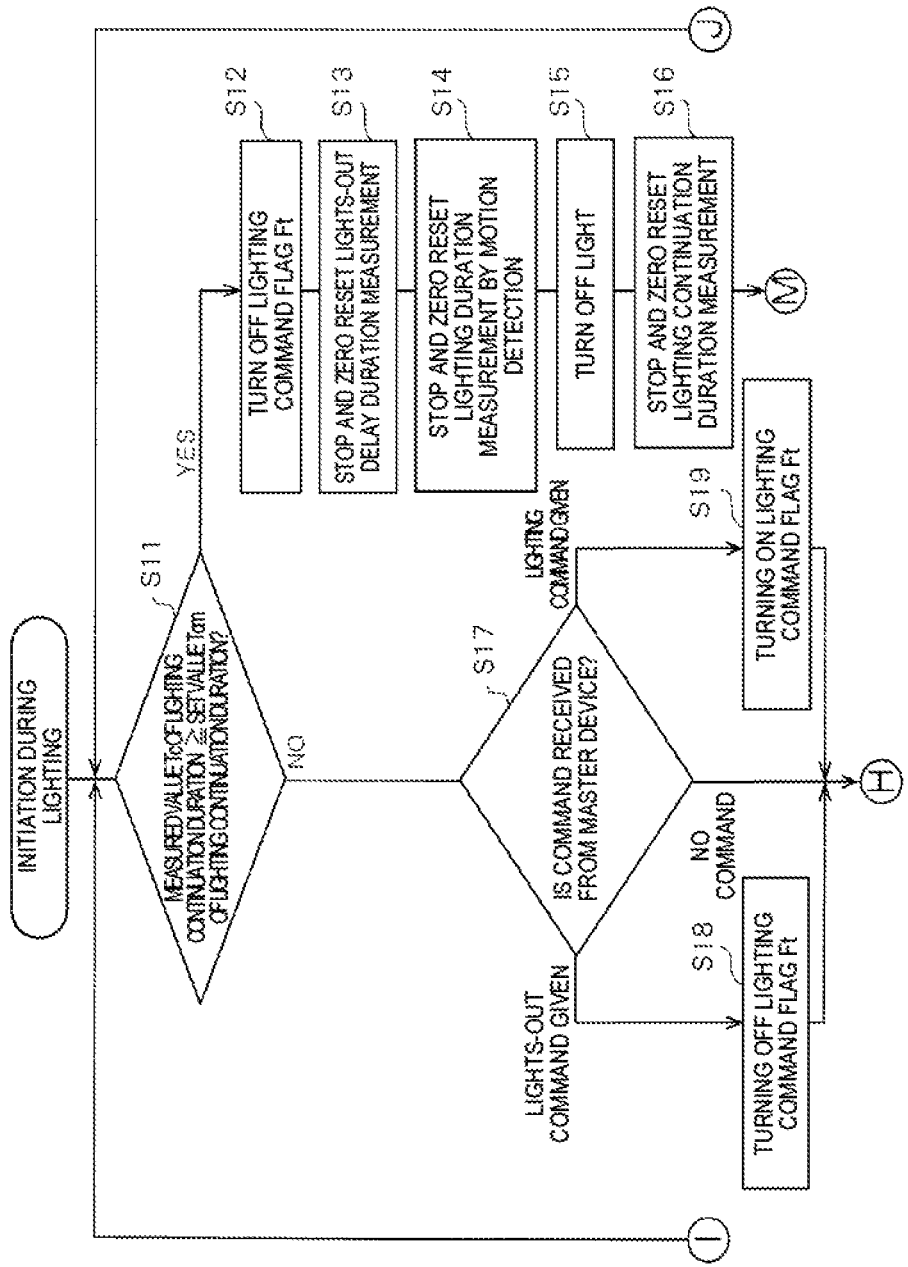
FIG. 19 is a flowchart describing an example of the operation procedures during lighting of the motion sensor light according to the present exemplary embodiment.
Figure 20:
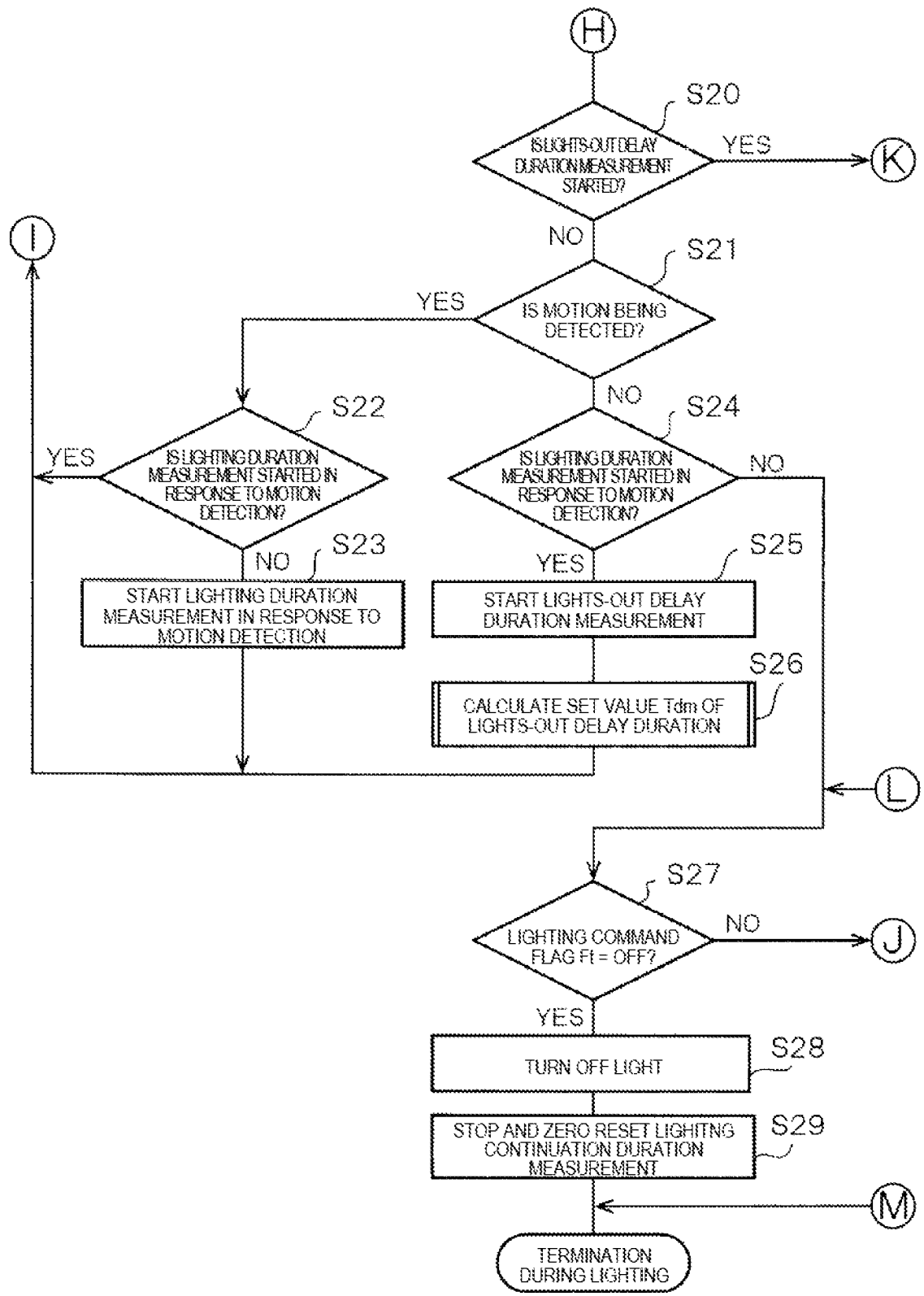
FIG. 20 is a flowchart describing an example of the operation procedures during lighting, in continuation of FIG. 19.
Figure 21:
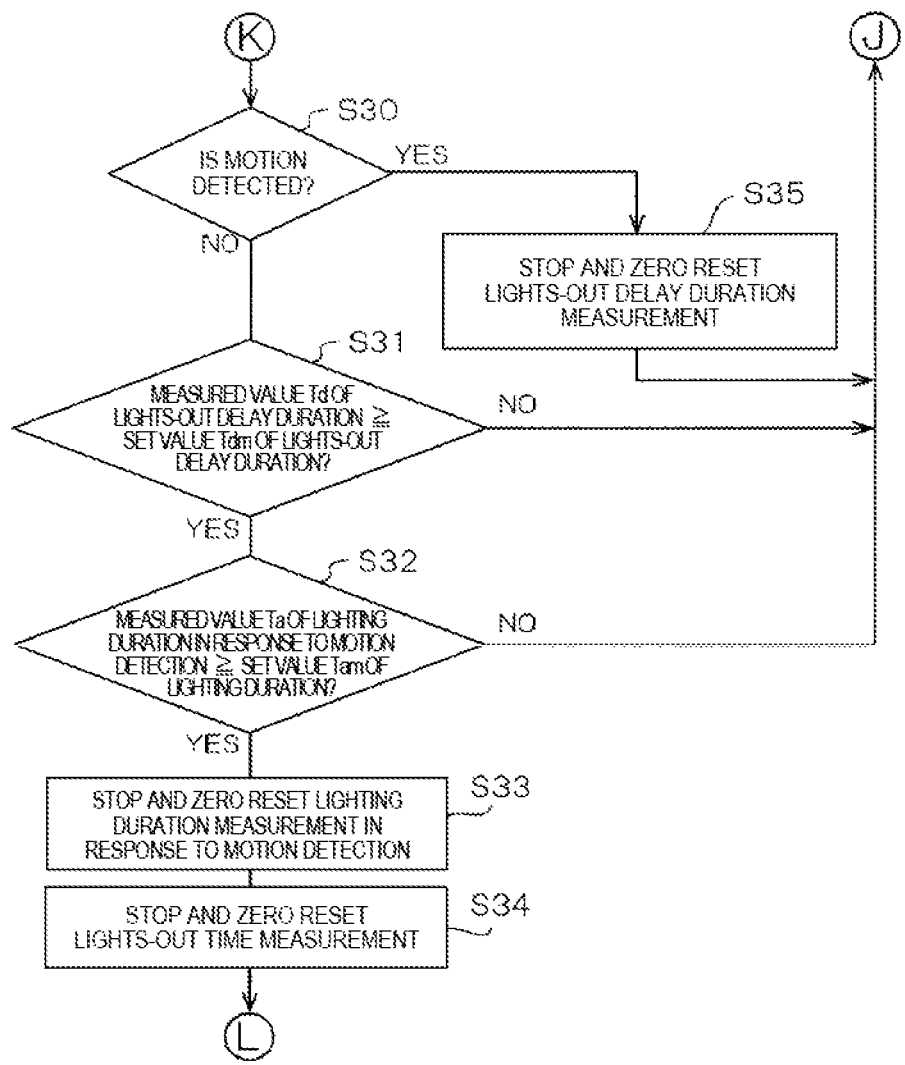
FIG. 21 is a flowchart describing an example of the operation procedures during lighting, in continuation of FIG. 19 and FIG. 20.

FIG. 19 is a flowchart describing an example of operation procedures during lighting of the motion sensor light according to the present exemplary embodiment. FIG. 20 is a flowchart describing an example of the operation procedures during lighting, in continuation of FIG. 19. FIG. 21 is a flowchart describing an example of the operation procedures during lighting, in continuation of FIG. 19 and FIG. 20. The operation is repeated and executed by processor 901 of motion sensor light 90 during lighting of light 907.

In FIG. 19, processor 901 determines whether or not measured value Tc of lighting continuation duration measured by lighting continuation duration measuring timer 901x is equal to or greater than set value Tcm of lighting continuation duration set in advance (S11). In a case where it is determined that measured value Tc of lighting continuation duration is equal to or greater than set value Tcm of lighting continuation duration (S11, YES), processor 901 sets lighting command flag Ft to be turned off (S12).

In a case where light 907 has been turned on based on the lighting command from master device 10 from the initiation of lighting of light 907 until measured value Tc of lighting continuation duration reaches set value Tcm of lighting continuation duration, lighting command flag Ft changes from a state of being turned on to off by lighting command flag Ft being turned off in Step S12. However, in a case where light 907 has been turned on based on only the detection of movement of a person conducted by motion sensor 906 from the initiation of lighting of light 907 until measured value Tc of lighting continuation duration reaches set value Tcm of lighting continuation duration, processing of Step S12 is omitted since lighting command flag Ft has already been turned off.

Processor 901 stops the measurement of measured value Td of lights-out delay duration conducted by lights-out delay duration measuring timer 901y, and resets the measured value of lights-out delay duration measuring timer 901y to 0 (S13). In a case where the light is turned on only by the lighting command from master device 10, processing of Step S13 is omitted since the measurement by lights-out delay duration measuring timer 901y is not being carried out.

In a case where the lighting duration is being measured based on the detection of movement of a person by motion sensor 906, processor 901 stops the measurement of measured value Ta of lighting duration by lighting duration measuring timer 901z and resets the measured value of lighting duration measuring timer 901z to 0 (S14). In a case where the light is turned on only by the lighting command from master device 10, processing of Step S14 is omitted.

Processor 901 turns off light 907 (S15). Processor 901 stops the measurement of lighting continuation duration by lighting continuation duration measuring timer 901x, and resets measured value Tc of lighting continuation duration to 0 (S16). After then, processor 901 terminates the operation of light 907 during lighting.

Meanwhile, in a case where measured value Tc of lighting continuation duration is smaller than set value Tcm of lighting continuation duration (S11, NO), for example, in a case where measured value Tc of lighting continuation duration is smaller than 15 minutes, processor 901 determines whether or not a command from master device 10 is received during lighting of light 907 (S17). The command from master device 10 is given, for example, based on the operation of smartphone 50 conducted by the user or in a case where a scenario registered in smart control setting table 180 is satisfied.

In a case where the command from master device 10 is a lights-out command (S17, lights-out command given), processor 901 sets lighting command flag Ft from master device 10 to be turned off (S18).

Meanwhile, in a case where the command from master device 10 is a lighting command (S17, lighting command given), processor 901 sets lighting command flag Ft from master device 10 to be turned on (S19).

In addition, in a case where the command from master device 10 is not given (S17, no commands), processing of processor 901 proceeds to Step S20.

In FIG. 20, processor 901 determines whether or not lights-out delay duration measuring timer 901y is started (that is, lights-out delay duration is being measured or not) (S20). Two cases, for example, a case where a person has been present all along from a time point of the previous processing of Step S20 until a time point of the current processing of Step S20 (that is, the person has been detected) and a case where a lighting command is given from master device 10 although a person has not been present all along (the person has not been detected), are considered as cases in which the measurement of lights-out delay duration is not started.

In a case where the measurement of lights-out delay duration is not started (S20, NO), processor 901 determines whether or not a person is currently being detected by motion sensor 906 (S21). In a case where a person is being detected (S21, YES), that is, in a case where a person is present in the detection area of motion sensor light 90, processor 901 determines whether or not the measurement of lighting duration measuring timer 901z is initiated in response to motion detection (S22). In a case where the measurement of lighting duration of light 907 is initiated in response to motion detection of a person (S22, YES), processing of processor 901 returns to Step S11 since the person is being detected by motion sensor 906.

Meanwhile, in a case where the measurement of lighting duration of light 907 is not initiated in response to the motion detection of a person (S22, NO), processor 901 initiates the measurement by lighting duration measuring timer 901z in response to the motion detection of the person since the movement of the person is being detected in Step S21 (S23). After then, processing of processor 901 returns to Step S11.

In addition, in a case where a person is not being detected in Step S21 (S21, NO), that is, in a case where a person is not present in the detection area of motion sensor light 90, processor 901 determines whether or not the measurement of lighting duration measuring timer 901z is initiated in response to motion detection (S24).

In a case where the measurement by lighting duration measuring timer 901z is initiated by a time point of processing of Step S24 (S24, YES), processor 901 initiates the measurement by lights-out delay duration measuring timer 901y since a person motion detection state is changed into a non-detection state (that is, a person has disappeared) (S25). Processor 901 calculates set value Tdm of lights-out delay duration corresponding to measured value Ta of lighting duration of light 907 (S26). Set value Tdm of lights-out delay duration in Step S26 is acquired by means of the aforementioned two methods (that is, the first setting method and the second setting method). After then, processing of processor 901 returns to Step S11.

Meanwhile, in a case where the measurement of lighting duration measuring timer 901z in response to the motion detection is not initiated by the time point of processing of Step S24 (S24, NO), processor 901 determines whether or not lighting command flag Ft according to the command from master device 10 is turned off (S27). In a case where it is determined that lighting command flag Ft in response to command from master device 10 is not turned off (S27, NO), processing of processor 901 returns to Step S11 since the lights-out command is not transmitted from master device 10 and thus the lighting of motion sensor light 90 is required to be continued.

In a case where lighting command flag Ft according to the command from master device 10 is turned off (S27, YES), processor 901 turns off light 907 (S28). After turning off the light, processor 901 stops the measurement of lighting continuation duration measuring timer 901x, and resets the measured value to 0 (S29). After then, processor 901 terminates the operation of light 907 during lighting. As described above, motion sensor light 90 is turned off in a case where motion sensor light 90 does not detect a person and a lights-out command is given from master device 10.

In FIG. 21, in a case where lights-out delay duration measuring timer 901y is started in Step S20 (S20, YES), it means that a person has disappeared after a state where the person has been present in the detection area of motion sensor light 90. In this case, processor 901 determines whether or not movement of a person is detected again by motion sensor 906 (S30).

In a case where the non-detection of the movement of the person continues in Step S30 (S30, NO), processor 901 determines whether or not measured value Td of lights-out delay duration measured by lights-out delay duration measuring timer 901y is equal to or greater than set value Tdm of lights-out delay duration (S31). In a case where measured value Td of lights-out delay duration is smaller than set value Tdm of lights-out delay duration (S31, NO), processing of processor 901 returns to Step S11.

Meanwhile, in a case where measured value Td of lights-out delay duration is equal to or greater than set value Tdm of lights-out delay duration (S31, YES), processor 901 determines whether or not measured value Ta of lighting duration measured by lighting duration measuring timer 901z based on the motion detection of the person is equal to or greater than set value Tam of lighting duration registered in setting information table 160 (S32). In a case where measured value Ta of lighting duration is smaller than set value Tam of lighting duration (S32, NO), processing of processor 901 returns to Step S11.

Meanwhile, in a case where measured value Ta of lighting duration is equal to or greater than set value Tam of lighting duration (S32, YES), processor 901 stops the measurement of lighting duration measuring timer 901z, and resets the measured value to 0 (S33). Furthermore, processor 901 stops the measurement of lights-out delay duration measuring timer 901y, and reset the measured value to 0 (S34). Then, processing of processor 901 proceeds to processing of Step S27, assuming that movement of a person is no longer detected. In processing after Step S27, as described above, motion sensor light 90 is turned off in a case where motion sensor light 90 does not detect a person and a lights-out command is given from master device 10.

In addition, in a case where movement of a person is detected again by motion sensor 906 in Step S30 (S30, YES), processor 901 stops the measurement of lights-out delay duration measuring timer 901y and resets the measured value to 0 in procedure to continue lighting of motion sensor light 90 (S35). After then, processing of processor 901 returns to Step S11.

Hereinbefore, in surveillance camera system 5 of the present exemplary embodiment, master device 10 is connected to each device that configures surveillance camera system 5, which includes motion sensor light 90, so as to be capable of carrying out wireless communication, and master device 10 can cause each device to perform operations set in smart control setting table 180. Master device 10 stores, for example, an operation condition for lighting and an operation condition for lights-out of motion sensor light 90 in storage 103. Examples of the operation condition for lighting or the operation condition for lights-out include, for example, a case where a scenario registered in smart control setting table 180 is satisfied and a case where the user directly operates smartphone 50 to turn on or turn off the light. Master device 10 transmits a lighting command to motion sensor light 90 in a case where the operation condition for lighting is satisfied. In addition, master device 10 transmits a lights-out command to motion sensor light 90 in a case where the operation condition for lights-out is satisfied. Motion sensor light 90 is turned on in a case where the lighting command is received from master device 10 or in a case where a moving object (for example, a human) is being detected. Meanwhile, motion sensor light 90 is turned off in a case where the lights-out command from master device 10 is received and a person non-detection state continues for a certain amount of time after a person is not detected.

As described above, in surveillance camera system 5 of the present exemplary embodiment, convenience can be improved for a user who passes the detection area of motion sensor light 90 (for example, in the vicinity of motion sensor light 90) since motion sensor light 90 is turned on immediately in a case where movement of a person is detected or in a case where a lighting command transmitted from master device 10 is received, assuming that an operation condition for lighting is satisfied.

In addition, in surveillance camera system 5, motion sensor light 90 is turned off in a case where a non-detection state of motion of a person by motion sensor light 90 is initiated and the non-detection state continues for a certain amount of time and in a case where a lights-out command is given from master device 10. Accordingly, according to surveillance camera system 5, user convenience can be improved since the light is not turned off immediately after a user who passes the detection area of motion sensor light 90 disappears. In addition, in surveillance camera system 5, master device 10 can flexibly alter lights-out timing of motion sensor light 90, following the intention of the user. For example, the user can directly give master device 10 the lights-out command by operating smartphone 50, or can flexibly alter the lights-out timing of the motion sensor light by registering a scenario for turning off the light.

In addition, motion sensor light 90 measures lighting duration by means of lighting duration measuring timer 901*z* in response to lighting and after then, in a case where a moving object is no longer detected, initiates the measurement of lights-out delay duration by means of lights-out delay duration measuring timer 901*y* to acquire set value Tdm of lights-out delay duration. Motion sensor light 90 is turned off in a case where measured value Td of lights-out delay duration exceeds set value Tdm of lights-out delay duration and in a case where measured value Ta of lighting duration exceeds set value Tam of lighting duration. Accordingly, motion sensor light 90 can cause turning on light 907 in a certain length of period to be compatible with restricting an increase in power consumption and turning off light 907 as soon as possible. In addition, motion sensor light 90 can be prevented from being turned off immediately even if the movement of a person is no longer detected at a time when the set lighting duration has passed.

In addition, once a scenario, in which a condition for lighting and a condition for lights-out of motion sensor light 90 are described, is generated by an electronic device, including smartphone 50, being operated or by master device 10 operating display 106, master device 10 stores data of the scenario in storage 103, which is a memory. Master device 10 transmits a lights-out command to motion sensor light 90 in a case where a scenario that indicates the operation condition for lights-out is satisfied. Accordingly, the user can generate a scenario by operating an electronic device, including smartphone 50, and can set lights-out timing of motion sensor light 90 at the user's discretion.

In addition, motion sensor light 90 is forcibly turned off in a case where measured value Ta of lighting duration exceeds set value Tcm of lighting continuation duration which is sufficiently greater than set value Tam of lighting duration. That is, motion sensor light 90 is forcibly turned off in a case where motion sensor light 90 is turned on for a time long enough to exceed set value Tcm of lighting continuation duration, even if receiving a lights-out command from master device 10, a time for which human non-detection continued during lighting of light 907 being equal to or greater than set value Tdm of lights-out delay duration, and measured value Ta of lighting duration being equal to or greater than set value Tam of lighting duration are not satisfied together. Accordingly, in a case where motion sensor light 90 is driven by a battery, turning on motion sensor light 90 for a long period of time due to a continued detection of a person can be avoided and an increase in consumption of batteries of motion sensor light 90 can be restricted.

In the present exemplary embodiment described above, the user sets and releases a scenario from smartphone 50 connected to master device 10. However, the user may also set and release a scenario by operating browser software installed in an electronic device, including a PC (not illustrated) connected to master device 10.

Next, each of sequence related to communication of each of motion sensor light 90 and master device 10 at a time when smart control is not set, at a time when a change is made from a state where the smart control is not set to a state where the smart control is set, and at a time when a change is made from a state where the smart control is set to a state where the smart control is not set will be described with reference to FIG. 22 to FIG. 25. As described above, setting of smart control is carried out, for example, by a scenario being newly created with smart control setting screen GM illustrated in FIG. 11 being used. In the following description, if necessary, a case where surveillance camera system 5 operates in accordance with the scenario number 3 registered in smart control setting table 180 will be described.
(Normal Operation: Operation at a State Where Smart Control is not Set)

Figure 22:
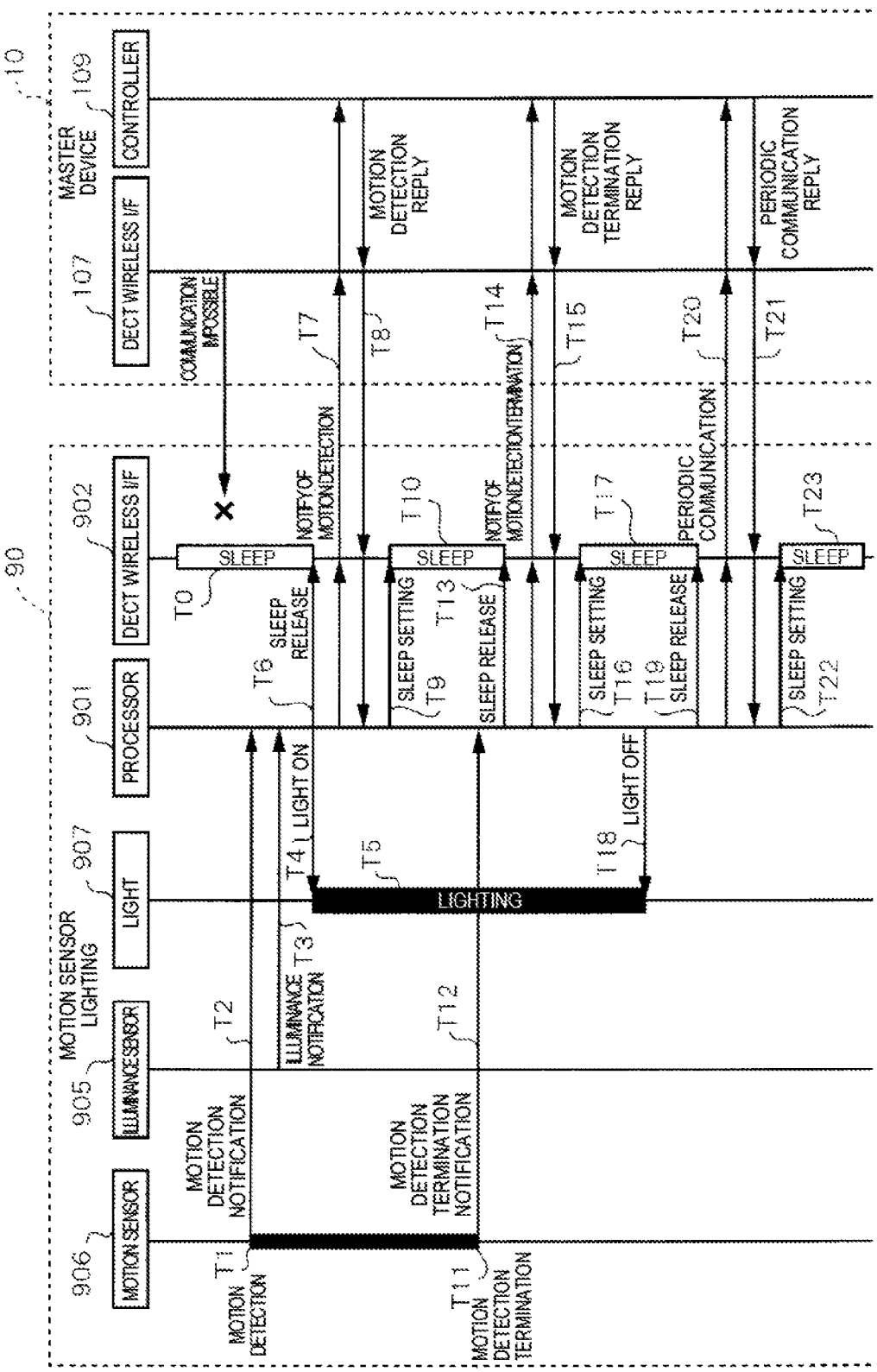
FIG. 22 is a sequence diagram illustrating an example of operation procedures of communication between the motion sensor light and the master device at a state where smart control is not set.

FIG. 22 is a sequence diagram illustrating an example of operation procedures of communication between motion sensor light 90 and master device 10 at a state where the smart control is not set. FIG. 22 illustrates operation procedures of releasing the sleep mode of motion sensor light 90 at a time when motion sensor light 90 has detected a human (human detection time) or at a time when periodic communication is carried out. As a prerequisite for describing FIG. 22, master device 10 itself is set in a mode where master device 10 can communicate with other devices (refer to FIG. 1) which include motion sensor light 90.

As described above, processor 901 is capable of communicating with master device 10 by using wireless communication system of DECT since motion sensor light 90 is driven by a battery. However, processor 901 is set to stay in a communication sleep mode (that is, a mode in which communication is not carried out), excluding a time when wireless communication with master device 10 is required to be carried out (for example, human detection time and periodic communication time with master device 10 illustrated in FIG. 22), in procedure To restrict an increase in power consumption.

In FIG. 22, DECT wireless I/F 902 of motion sensor light 90 is in a sleep state at an initial state (T0). Accordingly, communication from master device 10 to motion sensor light 90 is impossible. In this state, in a case where motion sensor 906 within motion sensor light 90 has detected movement of a person (human) (T1), processor 901 is notified of the motion detection including human detection (T2). In addition to human detection, motion detection includes detection of an animal other than a human and detection of a structure, including a car. Processor 901 acquires illuminance detected by illuminance sensor 905 (T3), and determines whether or not the surroundings are dark from the illuminance.

In a case where it is determined that the surroundings are dark, processor 901 commands light 907 to be turned on (T4). Determining whether or not the surroundings are dark is a known technique, and detailed description thereof will be omitted. It is possible to determine that the surroundings are dark insofar as illuminance acquired in procedure T3 is a value smaller than a predetermined threshold, and the same applies hereinafter. Light 907 is turned on once a command for lighting is received (T5).

In addition, processor 901 releases the sleep of DECT wireless I/F 902 almost simultaneously with the lighting command to light 907 (T6). Accordingly, motion sensor light 90 is capable of communicating with master device 10. In addition, processor 901 notifies controller 109 of master device 10 of motion detection in procedure T1 via activated DECT wireless I/F 902 (T7).

Once controller 109 of master device 10 receives motion detection from motion sensor light 90, controller 109 sends back a reply (motion detection reply) for the receipt (T8). Once processor 901 receives the motion detection reply from master device 10, processor 901 sets DECT wireless I/F 902 to a sleep state (T9). DECT wireless I/F 902 gets into a sleep state (T10). Accordingly, by motion sensor light 90 being brought into a state where ordinary communication with master device 10 is impossible, motion sensor light 90 can restrict an increase in power consumption without a need for carrying out ordinary communication.

After lighting is initiated in procedure T5, motion sensor light 90 is continued to be turned on instead of being turned off while movement of a person is continued to be detected. In a case where movement of person (human) is no longer detected (T11), motion sensor 906 within motion sensor light 90 outputs a motion detection termination notification to processor 901 (T12). FIG. 22 illustrates that motion sensor 906 has detected a human in a period of procedures T1 to T11.

Once processor 901 receives the motion detection termination notification, processor 901 releases the sleep of DECT wireless I/F 902 (T13). Accordingly, motion sensor light 90 can communicate with master device 10. In addition, processor 901 notifies controller 109 of master device 10 of motion detection termination in procedure T11 via activated DECT wireless I/F 902 (T14).

Once controller 109 of master device 10 receives motion detection termination from motion sensor light 90, controller 109 sends back a reply (motion detection termination reply) for the receipt (T15). Once processor 901 receives the motion detection termination reply from master device 10, processor 901 sets DECT wireless I/F 902 to a sleep state (T16). DECT wireless I/F 902 gets into a sleep state (T17).

Accordingly, by motion sensor light 90 being brought into a state where communication with master device 10 is impossible, motion sensor light 90 can restrict an increase in power consumption without a need for carrying out ordinary communication.

Once processor 901 receives the motion detection termination notification in procedure T12, light 907 is turned off after the measured value of lighting duration of light 907 has passed the set value of lighting duration of light 907 set in advance and the measured value of lights-out delay duration has passed the set value of lights-out delay duration (T18). FIG. 12 illustrates that light 907 has been turned on in a period of procedures T5 to T18.

In addition, processor 901 of motion sensor light 90 carries out periodic communication with master device 10. For example, periodic communication is carried out once for every 90 minutes. Once a time for periodic communication is reached, processor 901 releases the sleep of DECT wireless I/F 902 (T19). Accordingly, motion sensor light 90 can communicate with master device 10. In addition, processor 901 carries out periodic communication with controller 109 of master device 10 via activated DECT wireless I/F 902 (T20). In this periodic communication, motion sensor light 90 reports to master device 10 by notifying master device 10 of information including an operation situation.

Controller 109 of master device 10 sends back a periodic communication reply to motion sensor light 90 (T21). Once processor 901 receives the periodic communication reply from master device 10, processor 901 sets DECT wireless I/F 902 to a sleep state (T22). DECT wireless I/F 902 gets into a sleep state (T23). Accordingly, by motion sensor light 90 being brought into a state where communication with master device 10 is impossible, motion sensor light 90 can restrict an increase in power consumption without a need for carrying out ordinary communication.

As described above, in the normal operation illustrated in FIG. 22, motion sensor light 90 stops communication with master device 10 by bringing DECT wireless I/F 902 into a sleep state, except for periods in which motion detection communication and periodic communication are carried out. Accordingly, power consumption of a battery is restrained and thus power conservation is achieved. Therefore, frequent replacement of a battery fades away.

(From a State Where Smart Control is not Set to a State Where Smart Control is Set: Turning on Ordinary Communication at Human Detection Time)

Figure 23:
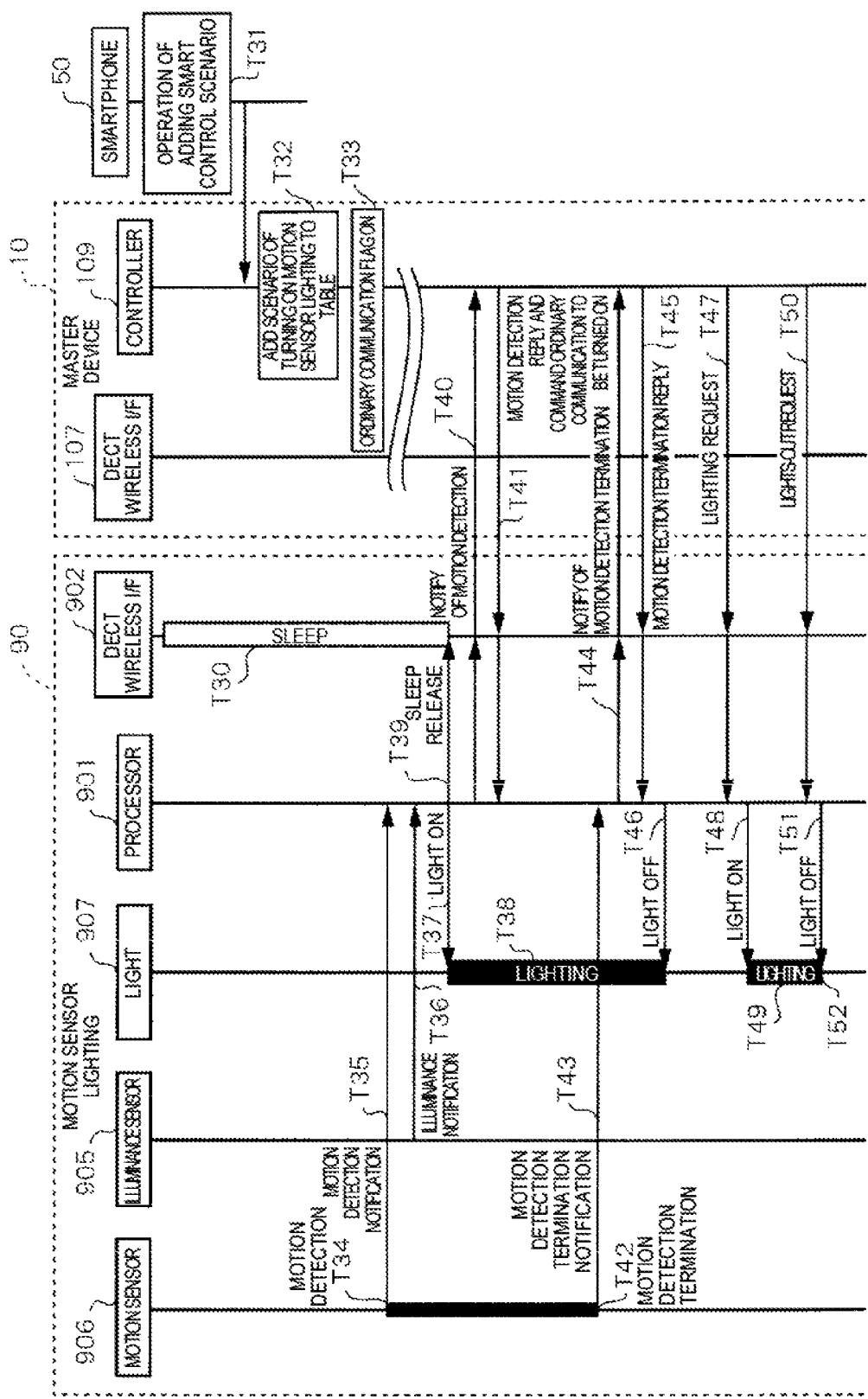
FIG. 23 is a sequence diagram illustrating a first example of operation procedures of communication between the motion sensor light and the master device in a case where the smart control has transitioned from a state of being not set to a state of being set.

FIG. 23 is a sequence diagram illustrating a first example of operation procedures of communication between the motion sensor light and the master device in a case where the smart control has transitioned from a state of being not set and to a state of being set. FIG. 23 illustrates operation procedures in which the sleep mode is released so as to be switched to ordinary communication at a time when motion sensor light 90 has detected a human (human detection time). As a prerequisite for describing FIG. 23, master device 10 itself is set in a mode where master device 10 can communicate with other devices (refer to FIG. 1) which include motion sensor light 90.

In FIG. 23, DECT wireless I/F 902 of motion sensor light 90 is in a sleep state at an initial state (T30). Smartphone 50 displays smart control setting screen GM according to the operation by the user, and receives an operation of adding a scenario related to lighting of the motion sensor light set by the user on smart control setting screen GM (T31). Smartphone 50 transmits data of the scenario related to lighting of the motion sensor light to master device 10.

Once controller 109 of master device 10 receives the scenario set on smart control setting screen GM, controller 109 adds the scenario to smart control setting table 180 stored in storage 103 and updates the table (T32). As a scenario for turning on the motion sensor light, for example, a scenario, in which a motion detection notification is transmitted to master device 10 and master device 10 commands motion sensor light 90 to be turned on once surveillance camera 30B provided outdoors detects a human, is set in smart control setting table 180 (refer to FIG. 13).

Once the scenario is added, controller 109 of master device 10 turns on an ordinary communication flag (T33). After then, controller 109 may display a command (message) that induces human detection, for example, "please wave your hand before the motion sensor light" or the like, on the screen of display and operator 503 of smartphone 50 that belongs to the user. Accordingly, master device 10 can cause the user to act on motion confirmation of motion sensor light 90 specified in the scenario added in procedure T32, thereby improving usability.

In the sleep state of DECT wireless I/F 902 of motion sensor light 90, in a case where the user has waved a hand before motion sensor light 90 in accordance with the command (message) displayed on display and operator 503 of smartphone 50 or a third party has entered the detection area of motion sensor light 90, motion sensor 906 detects the movement of the user's hand or a human (T34) and notifies processor 901 of the motion detection (T35). Processor 901 acquires illuminance detected by illuminance sensor 905 (T36), and determines whether or not the surroundings are dark from the illuminance.

In a case where it is determined that the surroundings are dark, processor 901 commands light 907 to be turned on (T37). Light 907 is turned on once a command for lighting is received (T38). In addition, processor 901 releases the sleep of DECT wireless I/F 902 almost simultaneously with the lighting command to light 907 (T39). Accordingly, motion sensor light 90 can communicate with master device 10. Furthermore, processor 901 notifies controller 109 of master device 10 of motion detection in procedure T34 via activated DECT wireless I/F 902 (T40).

Once controller 109 of master device 10 receives motion detection from motion sensor light 90, controller 109 sends back a reply for the receipt and notifies processor 901 that ordinary communication is turned on (T41).

Once processor 901 of motion sensor light 90 receives the ordinary communication turned-on notification, processor 901 carries out ordinary communication with master device 10 until an ordinary communication turned-off notification is received or a power supply is operated and turned off. In a case where the motion of the user waving a hand is no longer detected or the third party is no longer detected (T42), motion sensor 906 sends a motion detection termination notification to processor 901 (T43). Processor 901 transmits the motion detection termination notification to controller 109 of master device 10 (T44).

Controller 109 of master device 10 sends back a motion detection termination reply to processor 901 (T45). Once processor 901 receives the motion detection termination reply in procedure T45, light 907 is turned off after the measured value of lighting duration of light 907 has passed the set value of lighting duration of light 907 set in advance and the measured value of lights-out delay duration has passed the set value of lights-out delay duration (T46).

After procedure T46, a state where ordinary communication between motion sensor light 90 and master device 10 is possible continues, and controller 109 of master device 10 sends a lighting request to motion sensor light 90 in a case where a scenario related to lighting of motion sensor light 90 registered in smart control setting table 180 is satisfied (T47).

Once processor 901 of motion sensor light 90 receives the lighting request from controller 109 of master device 10, processor 901 commands light 907 to be turned on (T48). Once light 907 receives a command for lighting, light 907 remains turned on until a command for lights-out from processor 901 is given (T49).

Controller 109 of master device 10 sends a lights-out request to motion sensor light 90 in a case where a scenario (not illustrated) related to lights-out of motion sensor light 90 registered in smart control setting table 180 is satisfied (T50).

Once processor 901 of motion sensor light 90 receives the lights-out request from controller 109 of master device 10, processor 901 commands light 907 to be turned off (T51). Light 907 is turned on once the command for lights-out is received (T52).

As described above, once motion sensor light 90 detects movement of a person, master device 10 gives a setting command for ordinary communication to motion sensor light 90 to synchronize with the detection. Motion sensor light 90 releases the sleep mode of communication and sets ordinary communication to become possible in accordance with the setting command from master device 10. Therefore, even in a case where a communication initiation trigger is on a motion sensor light 90 side, an opportunity for master device 10 to communicate with motion sensor light 90 is ensured, and motion sensor light 90 can be switched to a state where ordinary communication is turned on in a case where motion sensor light 90 is required to communicate with master device 10, thereby improving usability. In addition, human detection by motion sensor light 90 is induced by displaying a message, such as "please wave your hand", on the screen of smartphone 50, and communication of motion detection from motion sensor light 90 to master device 10 is carried out. Accordingly, motion sensor light 90 can promptly reflect the setting of turning on ordinary communication from master device 10.

(From a State Where Smart Control is not Set to a State Where Smart Control is Set: Turning on Ordinary Communication in Periodic Communication)

Figure 24:
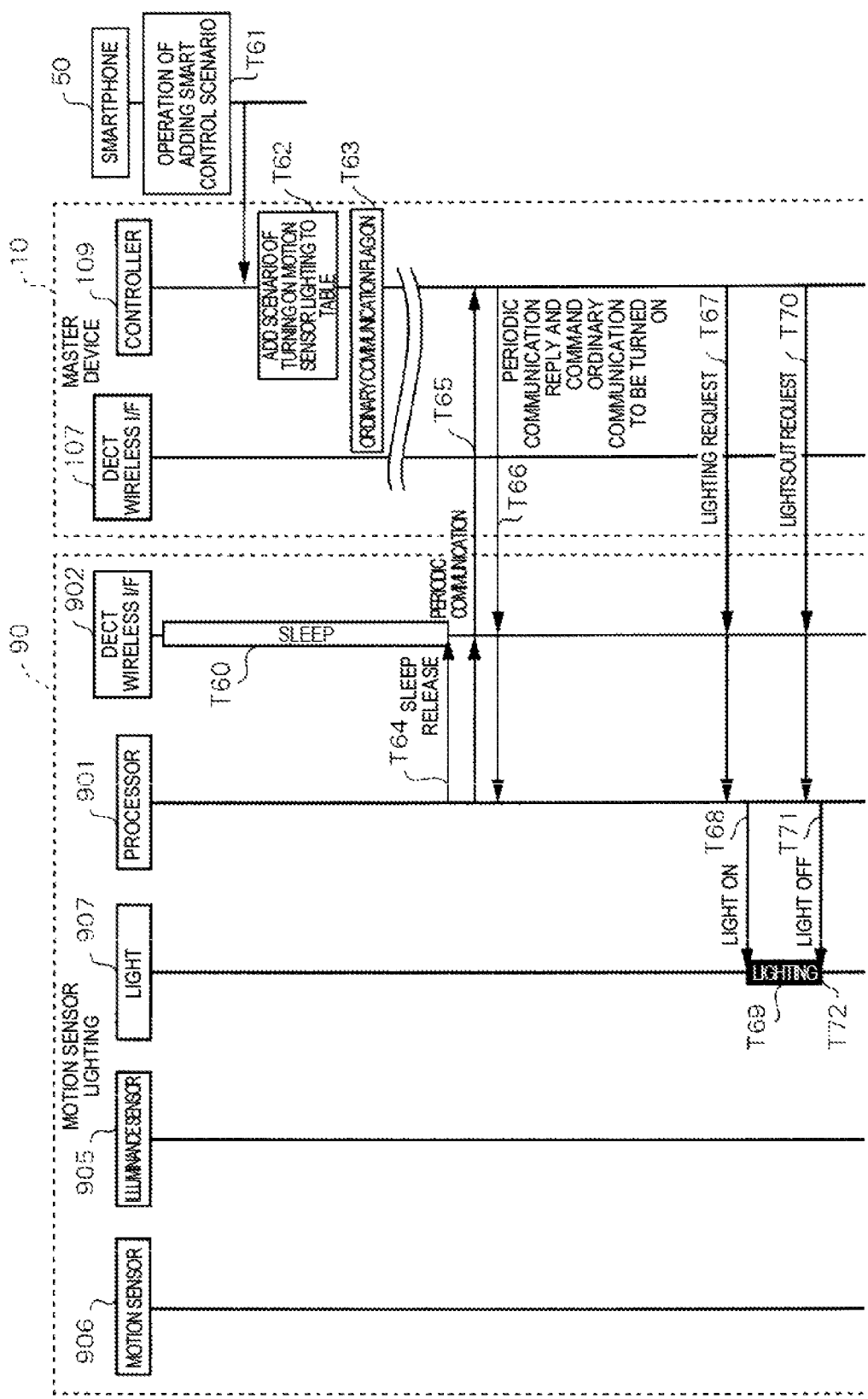
FIG. 24 is a sequence diagram illustrating a second example of operation procedures of communication between the motion sensor light and the master device in a case where the smart control has transitioned from a state of being not set to a state of being set.

FIG. 24 is a sequence diagram illustrating a second example of operation procedures of communication between the motion sensor light and the master device in a case where the smart control has transitioned from a state of being not set and to a state of being set. FIG. 24 illustrates operation procedures in which the sleep mode is released so as to be switched to ordinary communication at a time when motion sensor light 90 carries out periodic communication. As a prerequisite for describing FIG. 24, master device 10 itself is set in a mode where master device 10 can communicate with other devices (refer to FIG. 1) which include motion sensor light 90.

In FIG. 24, DECT wireless I/F 902 of motion sensor light 90 is in a sleep state at an initial state (T60). Since an operation in which controller 109 of master device 10 turns on the ordinary communication flag in procedures T61 to T63 is similar to the operation in procedures T31 to T33 illustrated in FIG. 23, description thereof will be omitted.

Processor 901 of motion sensor light 90 carries out periodic communication with master device 10. For example, periodic communication is carried out once for every 90 minutes. Once a time for periodic communication is reached, processor 901 releases the sleep of DECT wireless I/F 902 (T64). Accordingly, motion sensor light 90 can communicate with master device 10. In addition, processor 901 carries out periodic communication with controller 109 of master device 10 via activated DECT wireless I/F 902 (T65). In this periodic communication, motion sensor light 90 reports to master device 10 by notifying master device 10 of information including an operation situation.

Controller 109 of master device 10 sends back the periodic communication reply to motion sensor light 90, and gives a command for turning on ordinary communication (T66).

After procedure T66, ordinary communication is carried out between motion sensor light 90 and master device 10 via DECT wireless I/F 902.

Similar to procedures T47 to T52 illustrated in FIG. 23, controller 109 of master device 10 sends a lighting request to motion sensor light 90 in a case where a scenario related to lighting of motion sensor light 90 registered in smart control setting table 180 is satisfied (T67).

Once processor 901 of motion sensor light 90 receives the lighting request from controller 109 of master device 10, processor 901 commands light 907 to be turned on (T68). Once light 907 receives a command for lighting, light 907 remains turned on until a command for lights-out from processor 901 is given (T69).

Controller 109 of master device 10 sends a lights-out request to motion sensor light 90 in a case where a scenario (not illustrated) related to lights-out of motion sensor light 90 registered in smart control setting table 180 is satisfied (T70).

Once processor 901 of motion sensor light 90 receives the lights-out request from controller 109 of master device 10, processor 901 commands light 907 to be turned off (T71). Light 907 is turned on once the command for lights-out is received (T72).

As described above, master device 10 gives a setting command for ordinary communication to motion sensor light 90 by using periodic communication from motion sensor light 90 to master device 10. Motion sensor light 90 releases the sleep mode of communication and sets ordinary communication to be possible in accordance with the setting command from master device. Therefore, even in a case where a communication initiation trigger is on a motion sensor light 90 side, an opportunity for master device 10 to communicate with motion sensor light 90 is ensured, and motion sensor light 90 can be switched to a state where ordinary communication is turned on in a case where motion sensor light 90 is required to communicate with master device 10, thereby improving usability. In addition, the user does not need to do motions, such as waving a hand, which causes motion sensor light 90 to detect a human by using periodic communication.

FIG. 25 is a sequence diagram illustrating an example of operation procedures of communication between the motion sensor light and the master device in a case where the smart control has transitioned from a state of being set and to a state of being not set. FIG. 25 illustrates operation procedures in which ordinary communication of motion sensor light 90 is switched off and a transition to a sleep mode is made by smartphone 50 that belongs to the user being operated. As a prerequisite for describing FIG. 25, master device 10 itself is set to a mode, in which communication with other devices (refer to FIG. 1) including motion sensor light 90 is possible, DECT wireless I/F 902 of motion sensor light 90 is activated, and ordinary communication between motion sensor light 90 and master device 10, is carried out.

In FIG. 25, smartphone 50 receives a command for releasing a scenario related to lighting of motion sensor light 90 by the operation by the user (T81).

Once controller 109 of master device 10 receives the command for deleting the scenario related to lighting of motion sensor light 90, controller 109 deletes the scenario from smart control setting table 180 stored in storage 103 (T82). Then, controller 109 turns off ordinary communication flag (T83).

After procedure T84, controller 109 of master device 10 commands motion sensor light 90 to turn off ordinary communication (T84).

Once processor 901 of motion sensor light 90 receives the command for turning off ordinary communication, processor 901 transmits an ordinary communication off reply to controller 109 (T85). Processor 901 sets the sleep of DECT wireless I/F 902 (T86). DECT wireless I/F 902 transitions to a sleep state (T87). Accordingly, by motion sensor light 90 being brought into a state where communication with master device 10 is impossible, motion sensor light 90 can restrict an increase in power consumption without a need for carrying out ordinary communication.

As described above, once the scenario deleted to lighting of motion sensor light 90 is released by smartphone 50 being operated by the user, master device 10 sets motion sensor light 90 such that ordinary communication is turned off. Therefore, master device 10 can switch communication between motion sensor light 90 and master device 10 itself to a state where ordinary communication is turned off at the user's convenience, thereby improving usability.

Hereinbefore, in surveillance camera system 5 of the present exemplary embodiment, the sleep mode is turned off, and a notification of motion detection, including human detection, is transmitted to master device 10 in a case where motion sensor light 90 detects an event during the sleep mode of communication (for example, movement of a person is detected or periodic communication is carried out). Once master device 10 receives the notification of motion detection or the like, master device 10 generates a command for turning on ordinary communication, as a communication continuation command, to motion sensor light 90. Motion sensor light 90 continues to maintain a sleep mode off state based on receipt of the command for turning on ordinary communication. As described above, master device 10 can switch to a setting of continuing the sleep mode off state of motion sensor light 90 (that is, setting of turning on ordinary communication). Therefore, master device 10 can work together with motion sensor light 90 when transmitting information to and receiving information from motion sensor light 90 even if motion sensor light 90 does not always carry out communication. Furthermore, since motion sensor light 90 is capable of carrying out ordinary communication only at the time of working together, power conservation is achieved at a time when operating motion sensor light 90 and a decline in usability can be restricted.

In addition, once the scenario related to operation (for example, lighting and lights-out) of motion sensor light 90 is generated by the operation of an external device, including smartphone 50, as a mobile phone terminal or by the operation of master device 10 with respect to display 106, master device 10 stores data of the scenario in storage 103, which is a memory, and further transmits the data to motion sensor light 90. Accordingly, the user can generate a desired scenario by operating smartphone 50, thereby improving usability. In addition, the user can set an operation using the motion sensor light at the user's discretion by generating the scenario.

In addition, motion sensor light 90 detects that a moving object (for example, a person) has been sensed, as an event. Accordingly, the master device can be promptly notified of motion detection of the moving object. Therefore, surveillance camera system 5 can maintain security performance while achieving power conservation in a case where a human, which is a detection target, is a suspicious person such as an intruder. In addition, even in a case where surveillance camera system 5 is not used for security purposes, by motion sensor light 90 promptly notifying master device 10 of human detection results, processing of smart control, in which master device 10 has set human detection by motion sensor light 90 as an activation trigger, can be effectively carried out, thereby improving convenience.

In addition, motion sensor light 90 detects that a time for periodic communication with master device 10 has been reached, as an event. Accordingly, periodic communication between motion sensor light 90 and master device 10 becomes possible, and thus an opportunity for the master device to communicate can be ensured even in a case where a communication initiation trigger is on a motion sensor light side.

In addition, once data of the scenario related to operation (for example, lighting and lights-out) of motion sensor light 90 is deleted by smartphone 50 being operated, master device 10 generates a command for turning off ordinary communication as a communication continuation release command, and transmits the command to motion sensor light 90. Motion sensor light 90 transitions to a sleep mode on state once motion sensor light 90 receives the command for turning off ordinary communication. As described above, since switching to a setting of turning off ordinary communication is possible, power consumption of motion sensor light 90 is restricted and power conservation can be achieved at a time when motion sensor light 90 and master device 10 may not work together.

Hereinbefore, the present exemplary embodiment has been described with reference to the drawings, and it is needless to say that the present disclosure is not limited to such examples. It is evident for those skilled in the art that various modification examples or correction examples can be made within the categories described in the scope of the claims, and it is a matter of course that even those examples are understood as examples which fall under the technical scope of the present disclosure.

In addition, the present disclosure provides the motion sensor light with a program that realizes the aforementioned functions of the motion sensor light according to the present exemplary embodiment via a network or various types of storage media. The present disclosure is applicable to the program that is executed by the processor within the motion sensor light reading the program and a recording medium in which the program is recorded.

The present disclosure is useful as a motion sensor light and a surveillance camera system in which keeping a light on in a certain length of period is compatible with turning off the light as soon as possible to restrict an increase in power consumption, and when movement of a moving object is detected and the light is turned on, the light can be prevented from being turned off immediately after the movement of the person is no longer detected directly before set lighting is terminated.

What is claimed is:

1. A motion sensor light comprising:
a light that remains turned on at least for a predetermined duration set in advance;
a sensor that detects movement of a moving object; and
a processor that turns on the light in a case where the movement of the moving object is detected,
wherein the processor initiates measurement of lighting duration of the light in response to the lighting of the light, after then, initiates measurement of lights-out delay duration that indicates time duration for a non-detection state of the moving object from a time when the moving object is no longer detected to a time when the light is turned off in a case where the movement of the moving object is no longer detected, and acquires a set value of the lights-out delay duration according to the duration set in advance, and
the light is turned off in a case where a measured value of the lights-out delay duration exceeds the set value of the acquired lights-out delay duration, and a measured value of the lighting duration of the light exceeds the duration set in advance.

2. The motion sensor light of claim 1, further comprising:
a memory which correlates the set value of the lights-out delay duration with a set value of the lighting duration of the light and stores the correlated set value,
wherein the processor acquires the set value of the lights-out delay duration by reading the set value of the lighting duration of the light.

3. The motion sensor light of claim 2,
wherein the set value of the lights-out delay duration is set to different duration according to the set value of the lighting duration of the light.

4. The motion sensor light of claim 1,
wherein the processor acquires, as the set value of the lights-out delay duration, a value, which is a predetermined proportion of a measured value of the lighting duration of the light at a time point when the moving object is no longer detected.

5. The motion sensor light of claim 1,
wherein the processor determines whether or not a measured value of the lighting duration of the light exceeds the duration set in advance after the set value of the lights-out delay duration is determined to be exceeded by a measured value of the lights-out delay duration.

6. A surveillance system comprising:
a motion sensor light and a master device which are connected to each other,
wherein the master device saves each operation condition for lighting and lights-out of the motion sensor light, transmits a lighting command to the motion sensor light in a case where the operation condition for lighting is satisfied, and that transmits a lights-out command to the motion sensor light in a case where the operation condition for lights-out is satisfied; and
the motion sensor light is turned on in a case where the lighting command transmitted from the master device is received or in a case where a moving object is detected in the surroundings of the motion sensor light, and is turned off in a case where the lights-out command transmitted from the master device is received and a non-detection state of the moving object continues for a certain amount of time after the moving object is no longer detected.

7. The surveillance system of claim 6,
wherein the motion sensor light initiates measurement of lighting duration in response to lighting, after then, initiates measurement of lights-out delay duration that indicates the certain amount of time for which the non-detection state of the moving object, from a time when the moving object is no longer detected to a time when the light is turned off, continues in a case where the moving object is no longer detected, and acquires a set value of the lights-out delay duration set in advance, and the motion sensor light is turned off in a case where a measured value of the lights-out delay duration exceeds the acquired set value of the lights-out delay duration and a measured value of the lighting duration exceeds the set value of the lighting duration set in advance.

8. The surveillance system of claim 6, wherein the master device includes a memory, and once the operation condition for lighting or the operation condition for lights-out of the motion sensor light is generated, the master device stores the operation condition in the memory and transmits the lights-out command to the motion sensor light in a case where the operation condition for lights-out stored in the memory is satisfied.

9. The surveillance system of claim 6, wherein the motion sensor light is turned off in a case where a measured value of lighting duration exceeds forced lights-out duration, which is greater than a set value of the lighting duration.

10. A monitoring method for a surveillance system in which a motion sensor light and a master device are connected to each other, comprising:

saving, which is carried out by the master device, each operation condition for lighting and lights-out of the motion sensor light;

transmitting, which is carried out by the master device, a lighting command to the motion sensor light in a case where the operation condition for lighting is satisfied;

transmitting, which is carried out by the master device, a lights-out command to the motion sensor light in a case where the operation condition for lights-out is satisfied;

turning on the motion sensor light in a case where the lighting command transmitted from the master device is received or in a case where a moving object is detected in the surroundings of the motion sensor light; and turning off the motion sensor light in a case where the lights-out command transmitted from the master device is received and a non-detection state of the moving object continues for a certain amount of time after the moving object is no longer detected.

\* \* \* \* \*